(12) United States Patent
Ahn et al.

(10) Patent No.: US 11,515,957 B2
(45) Date of Patent: *Nov. 29, 2022

(54) WIRELESS COMMUNICATION METHOD AND WIRELESS COMMUNICATION TERMINAL

(71) Applicants: WILUS INSTITUTE OF STANDARDS AND TECHNOLOGY INC., Gyeonggi-do (KR); SK TELECOM CO., LTD., Seoul (KR)

(72) Inventors: Woojin Ahn, Gyeonggi-do (KR); Yongho Kim, Incheon (KR); Jinsam Kwak, Gyeonggi-do (KR); Juhyung Son, Gyeonggi-do (KR)

(73) Assignees: WILUS INSTITUTE OF STANDARDS AND TECHNOLOGY INC., Gyeonggi-Do (KR); SK TELECOM CO., LTD., Seoul (KR)

( * ) Notice: Subject to any disclaimer, the term of this patent is extended or adjusted under 35 U.S.C. 154(b) by 50 days.

This patent is subject to a terminal disclaimer.

(21) Appl. No.: 17/138,897

(22) Filed: Dec. 31, 2020

(65) Prior Publication Data

US 2021/0119720 A1  Apr. 22, 2021

Related U.S. Application Data

(63) Continuation of application No. 15/506,235, filed as application No. PCT/KR2015/009054 on Aug. 28, 2015, now Pat. No. 10,917,189.

(30) Foreign Application Priority Data

Aug. 29, 2014 (KR) .................. 10-2014-0114611
Aug. 29, 2014 (KR) .................. 10-2014-0114612

(51) Int. Cl.
  *H04B 1/707*  (2011.01)
  *H04J 13/00*  (2011.01)
  (Continued)

(52) U.S. Cl.
  CPC ............ *H04J 13/004* (2013.01); *H04B 1/707* (2013.01); *H04W 74/006* (2013.01);
  (Continued)

(58) Field of Classification Search
  CPC .. H04B 1/707; H04J 13/004; H04W 72/0426; H04W 74/006; H04W 74/0808; H04W 74/0866; H04W 84/12
  See application file for complete search history.

(56) References Cited

U.S. PATENT DOCUMENTS 6,850,504 B1  2/2005  Cao et al.
6,882,841 B1  4/2005  Youn
(Continued)

FOREIGN PATENT DOCUMENTS

CN  1930824  3/2007
CN  101076003  11/2007
(Continued)

OTHER PUBLICATIONS

International Search Report for PCT/KR2015/009054 dated Feb. 23, 2016 and its English translation from WIPO.
(Continued)

*Primary Examiner* — Alpus Hsu
(74) *Attorney, Agent, or Firm* — Ladas & Parry, LLP

(57) ABSTRACT

Disclosed is a wireless communication terminal. The wireless communication terminal includes a transceiver transmitting/receiving a wireless signal; and a processor controlling an operation of the wireless communication terminal. The transceiver receives a first frame including information on a manner for accessing, by a plurality of wireless
(Continued)

communication terminals including the wireless communication terminal, a base wireless communication terminal. The processor acquires a manner for accessing the base wireless communication terminal on a basis of the first frame. The transceiver accesses the base communication terminal on a basis of the manner for accessing the base wireless communication terminal. The base wireless communication terminal is any one communication terminal different from the plurality of wireless communication terminals.

7 Claims, 20 Drawing Sheets

(51) Int. Cl.
    *H04W 74/00*    (2009.01)
    *H04W 74/08*    (2009.01)
    *H04W 84/12*    (2009.01)
    *H04W 72/04*    (2009.01)

(52) U.S. Cl.
    CPC ....... *H04W 74/0866* (2013.01); *H04W 84/12* (2013.01); *H04W 72/0426* (2013.01); *H04W 74/0808* (2013.01)

(56) References Cited

U.S. PATENT DOCUMENTS

| | | | |
|---|---|---|---|
| 6,912,228 | B1 | 6/2005 | Dahlman et al. |
| 7,002,901 | B2 | 2/2006 | Yun et al. |
| 7,164,650 | B2 | 1/2007 | Kim et al. |
| 7,453,856 | B2 | 11/2008 | Guey |
| 8,031,739 | B2 | 10/2011 | Sawahashi et al. |
| 8,094,616 | B2 | 1/2012 | Choi et al. |
| 8,184,596 | B2 | 5/2012 | Karlsson et al. |
| 8,194,696 | B2 | 6/2012 | McBeath et al. |
| 8,611,266 | B2 | 12/2013 | Cho et al. |
| 8,767,570 | B2 | 7/2014 | Ong et al. |
| 9,001,747 | B2 | 4/2015 | Ojala et al. |
| 9,066,283 | B2 | 6/2015 | Seok |
| 9,072,101 | B2 | 6/2015 | Walton et al. |
| 9,173,235 | B2 | 10/2015 | Lim et al. |
| 9,210,719 | B2 | 12/2015 | Habetha et al. |
| 9,445,432 | B2 | 9/2016 | Tan et al. |
| 9,538,555 | B2 | 1/2017 | Park et al. |
| 9,608,796 | B2 | 3/2017 | Merlin et al. |
| 9,756,659 | B2 | 9/2017 | Seok |
| 9,877,312 | B2 | 1/2018 | Kim et al. |
| 10,051,624 | B2 | 8/2018 | Kaur et al. |
| 10,063,304 | B2 | 8/2018 | Frenne et al. |
| 2005/0053029 | A1 | 3/2005 | Lee et al. |
| 2005/0063330 | A1 | 3/2005 | Lee et al. |
| 2011/0019637 | A1 | 1/2011 | Ojala et al. |
| 2013/0286959 | A1 | 10/2013 | Lou et al. |
| 2013/0301569 | A1 | 11/2013 | Wang et al. |
| 2014/0192767 | A1 | 7/2014 | Au et al. |
| 2015/0327262 | A1 | 11/2015 | Kwon et al. |
| 2016/0285649 | A1 | 9/2016 | Luo et al. |
| 2018/0219644 | A1 | 8/2018 | Ahn et al. |

FOREIGN PATENT DOCUMENTS

| | | |
|---|---|---|
| KR | 10-2003-0017279 | 3/2003 |
| KR | 10-2004-0039348 | 5/2004 |
| KR | 10-2005-0029112 | 3/2005 |
| KR | 10-0871244 | 11/2008 |

OTHER PUBLICATIONS

Written Opinion of the International Searching Authority PCT/KR2015/009054 dated Feb. 23, 2016 and its English machine translation by Google Translate.

International Preliminary Report on Patentability for PCT/KR2015/009054 dated Feb. 28, 2017 and its English translation from WIPO.

Office Action dated Sep. 4, 2019 for Chinese Patent Application No. 201580046494.X and its English translation provided by Applicant's foreign counsel.

Notice of Allowance dated Oct. 5, 2020 for U.S. Appl. No. 15/506,235 (now published as US 2018/0219644).

Office Action dated Mar. 19, 2020 for U.S. Appl. No. 15/506,235 (now published as US 2018/0219644).

Final Office Action dated Nov. 21, 2019 for U.S. Appl. No. 15/506,235 (now published as US 2018/0219644).

Office Action dated Jun. 27, 2019 for U.S. Appl. No. 15/506,235 (now published as US 2018/0219644).

Final Office Action dated Feb. 14, 2019 for U.S. Appl. No. 15/506,235 (now published as US 2018/0219644).

Office Action dated Aug. 8, 2018 for U.S. Appl. No. 15/506,235 (now published as US 2018/0219644).

Notice of Allowance dated May 26, 2022 for Korean Patent Application No. 10-2017-7004201 and its English translation provided by Applicant's foreign counsel.

Office Action dated Apr. 21, 2022 for U.S. Appl. No. 17/138,898.

WIRELESS COMMUNICATION METHOD AND WIRELESS COMMUNICATION TERMINAL

CROSS-REFERENCE TO RELATED APPLICATIONS

This application is a continuation of U.S. patent application Ser. No. 15/506,235 filed on Feb. 23, 2017, which is the U.S. National Stage of International Patent Application No. PCT/KR2015/009054 filed on Aug. 28, 2015, which claims the priority to Korean Patent Application No. 10-2014-0114612 filed in the Korean Intellectual Property Office on Aug. 29, 2014, and Korean Patent Application No. 10-2014-0114611 filed in the Korean Intellectual Property Office on Aug. 29, 2014, the entire contents of which are incorporated herein by reference.

TECHNICAL FIELD

The present invention relates to a wireless communication method and a wireless communication terminal for setting a broadband link. More specifically, the present invention relates to a wireless communication method and a wireless communication terminal for increasing data communication efficiency by expanding a data transmission bandwidth of a terminal.

BACKGROUND ART

In recent years, with supply expansion of mobile apparatuses, a wireless LAN technology that can provide a rapid wireless Internet service to the mobile apparatuses has been significantly spotlighted. The wireless LAN technology allows mobile apparatuses including a smart phone, a smart pad, a laptop computer, a portable multimedia player, an embedded apparatus, and the like to wirelessly access the Internet in home or a company or a specific service providing area based on a wireless communication technology in a short range.

Institute of Electrical and Electronics Engineers (IEEE) 802.11 has commercialized or developed various technological standards since an initial wireless LAN technology is supported using frequencies of 2.4 GHz. First, the IEEE 802.11b supports a communication speed of a maximum of 11 Mbps while using frequencies of a 2.4 GHz band. IEEE 802.11a which is commercialized after the IEEE 802.11b uses frequencies of not the 2.4 GHz band but a 5 GHz band to reduce an influence by interference as compared with the frequencies of the 2.4 GHz band which are significantly congested and improves the communication speed up to a maximum of 54 Mbps by using an OFDM technology. However, the IEEE 802.11a has a disadvantage in that a communication distance is shorter than the IEEE 802.11b. In addition, IEEE 802.11g uses the frequencies of the 2.4 GHz band similarly to the IEEE 802.11b to implement the communication speed of a maximum of 54 Mbps and satisfies backward compatibility to significantly come into the spotlight and further, is superior to the IEEE 802.11a in terms of the communication distance.

Moreover, as a technology standard established to overcome a limitation of the communication speed which is pointed out as a weak point in a wireless LAN, IEEE 802.11n has been provided. The IEEE 802.11n aims at increasing the speed and reliability of a network and extending an operating distance of a wireless network. In more detail, the IEEE 802.11n supports a high throughput (HT) in which a data processing speed is a maximum of 540 Mbps or more and further, is based on a multiple inputs and multiple outputs (MIMO) technology in which multiple antennas are used at both sides of a transmitting unit and a receiving unit in order to minimize a transmission error and optimize a data speed. Further, the standard can use a coding scheme that transmits multiple copies which overlap with each other in order to increase data reliability.

As the supply of the wireless LAN is activated and further, applications using the wireless LAN are diversified, the need for new wireless LAN systems for supporting a higher throughput (very high throughput (VHT)) than the data processing speed supported by the IEEE 802.11n has come into the spotlight. Among them, IEEE 802.11ac supports a wide bandwidth (80 to 160 MHz) in the 5 GHz frequencies. The IEEE 802.11ac standard is defined only in the 5 GHz band, but initial 11ac chipsets will support even operations in the 2.4 GHz band for the backward compatibility with the existing 2.4 GHz band products. Theoretically, according to the standard, wireless LAN speeds of multiple stations are enabled up to a minimum of 1 Gbps and a maximum single link speed is enabled up to a minimum of 500 Mbps. This is achieved by extending concepts of a radio interface accepted by 802.11n, such as a wider radio frequency bandwidth (a maximum of 160 MHz), more MIMO spatial streams (a maximum of 8), multi-user MIMO, and high-density modulation (a maximum of 256 QAM). Further, as a scheme that transmits data by using a 60 GHz band instead of the existing 2.4 GHz/5 GHz, IEEE 802.11ad has been provided. The IEEE 802.11ad is a transmission standard that provides a speed of a maximum of 7 Gbps by using a beamforming technology and is suitable for high bit rate moving picture streaming such as massive data or non-compression HD video. However, since it is difficult for the 60 GHz frequency band to pass through an obstacle, it is disadvantageous in that the 60 GHz frequency band can be used only among devices in a short-distance space.

Meanwhile, in recent years, as next-generation wireless LAN standards after the 802.11ac and 802.11ad, discussion for providing a high-efficiency and high-performance wireless LAN communication technology in a high-density environment is continuously performed. That is, in a next-generation wireless LAN environment, communication having high frequency efficiency needs to be provided indoors/outdoors under the presence of high-density stations and access points (APs) and various technologies for implementing the communication are required.

Especially, as the number of devices using a wireless LAN increases, it is necessary to efficiently use a predetermined channel. Therefore, required is a technology capable of efficiently using bandwidths by simultaneously transmitting data between a plurality of stations and APs.

DISCLOSURE

Technical Problem

An object of an embodiment of the present invention is to provide an efficient wireless communication method and wireless communication terminal.

In particular, a purpose of an embodiment of the present invention is to provide a wireless communication method and wireless communication terminal in which a plurality of wireless communication terminals simultaneously transmit data to any one wireless communication terminal.

Technical Solution

A wireless communication terminal according to an embodiment of the present invention includes: a transceiver transmitting/receiving a wireless signal, and a processor controlling an operation of the wireless communication terminal, wherein the transceiver receives a first frame including information on a manner for accessing, by a plurality of wireless communication terminals including the wireless communication terminal, a base wireless communication terminal, the processor acquires a manner for accessing the base wireless communication terminal on a basis of the first frame, the transceiver accesses the base communication terminal on a basis of the manner for accessing the base wireless communication terminal, and the base wireless communication terminal is any one communication terminal different from the plurality of wireless communication terminals.

The information on the manner for accessing the base wireless communication terminal may include information on an orthogonal code used for accessing, by the wireless communication terminal, the base wireless communication terminal, and the transceiver may access the base wireless communication terminal on a basis of the information on the orthogonal code.

The information on the orthogonal code may include information on a plurality of orthogonal codes, the processor randomly may select any one of the plurality of orthogonal codes, and the transceiver may access the wireless communication terminal by using the selected orthogonal code.

The transceiver may transmit, to the base wireless communication terminal, required information for allocating a channel to the wireless communication terminal, receive a second frame indicating the channel allocated to the wireless communication terminal, and transmit data to the base wireless communication terminal on a basis of the second frame.

Required information for allocating channels to the plurality of wireless communication terminals may include information indicating a size of data to be transmitted by the wireless communication terminal to the base wireless communication terminal.

Required information for allocating channels to the plurality of wireless communication terminals may include information on idle channels sensed by the wireless communication terminal.

Required information for allocating channels to the plurality of wireless communication terminals may include an identifier for identifying the wireless communication terminal.

The transceiver may transmit a third frame to the base wireless communication terminal and then transmit meaningless dummy data.

The third frame may be a data frame including data.

The third frame may be a frame including required information for channel allocation for the wireless communication terminal to the base wireless communication terminal.

The transceiver may repeatedly transmit an identical frame to the base wireless communication terminal.

The information on the manner for accessing the base wireless communication terminal may include information on a time when the wireless communication terminal accesses the base wireless communication terminal.

The information on the manner for accessing the base wireless communication terminal may include information on a period that the wireless communication terminal accesses the base wireless communication terminal.

The transceiver may receive, from the base wireless communication terminal, a fourth frame for triggering an access to the base wireless communication terminal and access the base wireless communication terminal on a basis of the fourth frame.

A base wireless communication terminal according to an embodiment of the present invention includes: a transceiver transmitting/receiving a wireless signal; and a processor controlling an operation of the wireless communication terminal, where the transceiver transmits, to a plurality of wireless communication terminals, a first frame including information on a manner for accessing, by the plurality of communication terminals, the base wireless communication terminal.

The transceiver may receive, from the plurality of wireless communication terminals, required information for allocating channels to the plurality of wireless communication terminals, and the processor may allocate the channels the plurality of wireless communication terminals on a basis of the required information for allocating the channels to the plurality of wireless communication channels, and transmit a frame indicating the channels allocated to the plurality of wireless communication channels.

The required information for allocating the channels to the plurality of wireless communication terminals may include information on idle channels sensed by the wireless communication terminal.

The transceiver may receive a second frame from any one of the plurality of wireless communication terminals and then receive meaningless dummy data from the any one wireless communication terminal.

The information on the manner for accessing the base wireless communication terminal may include information on a period that the plurality of wireless communication terminals access the base wireless communication terminal.

An operation method of a wireless communication terminal according to an embodiment of the present invention includes: receiving, by a plurality of wireless communication terminals including the wireless communication terminal, a frame including information on a manner for accessing a base wireless communication terminal; acquiring the manner for accessing the base wireless communication terminal on a basis of a frame including information on the manner for accessing the base wireless communication terminal; and accessing the base communication terminal on a basis of the manner for accessing the base wireless communication terminal, wherein the base wireless communication terminal is any one wireless communication terminal different from the plurality of wireless communication terminals.

Advantageous Effects

An embodiment of the present invention provides an efficient wireless communication method and wireless communication terminal.

In particular, an embodiment of the present invention provides a wireless communication method and wireless communication terminal in which a plurality of wireless communication terminals simultaneously transmit data to any one wireless communication terminal.

MODE FOR CARRYING OUT THE INVENTION

Figure 1:
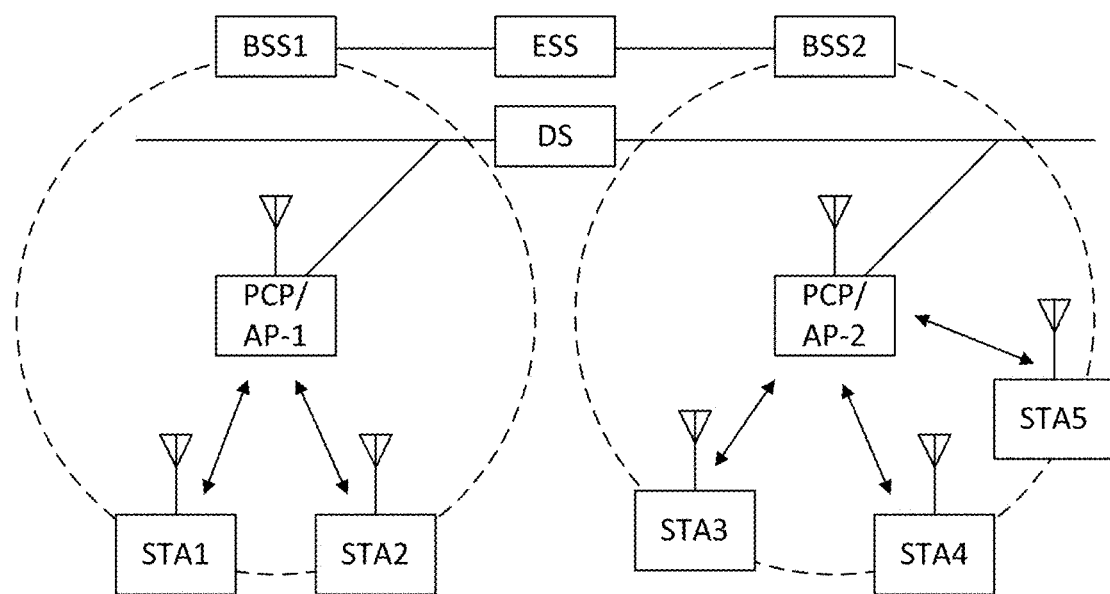
FIG. 1 is a view illustrating a wireless LAN system according to an embodiment of the present invention.

Preferred embodiments of the present invention will be described below in more detail with reference to the accompanying drawings. The present invention may, however, be embodied in different forms and should not be construed as limited to the embodiments set forth herein. Parts not relating to description are omitted in the drawings in order to clearly describe the present invention and like reference numerals refer to like elements throughout.

Furthermore, when it is described that one comprises (or includes or has) some elements, it should be understood that it may comprise (or include or has) only those elements, or it may comprise (or include or have) other elements as well as those elements if there is no specific limitation.

This application claims priority to and the benefit of Korean Patent Application Nos. 10-2014-0114611 and Nos. 10-2014-0114612 filed in the Korean Intellectual Property Office and the embodiments and mentioned items described in the respective applications are included in the Detailed Description of the present application.

FIG. 1 is a diagram illustrating a wireless LAN system according to an embodiment of the present invention. The wireless LAN system includes one or more basic service sets (BSS) and the BSS represents a set of apparatuses which are successfully synchronized with each other to communicate with each other. In general, the BSS may be classified into an infrastructure BSS and an independent BSS (IBSS) and FIG. 1 illustrates the infrastructure BSS between them.

As illustrated in FIG. 1, the infrastructure BSS (BSS1 and BSS2) includes one or more stations STA1, STA2, STA3, STA4, and STA5, access points PCP/AP-1 and PCP/AP-2 which are stations providing a distribution service, and a distribution system (DS) connecting the multiple access points PCP/AP-1 and PCP/AP-2.

The station (STA) is a predetermined device including medium access control (MAC) following a regulation of an IEEE 802.11 standard and a physical layer interface for a radio medium, and includes both a non-access point (non-AP) station and an access point (AP) in a broad sense. Further, in the present specification, a term 'terminal' may be used to refer to a concept including a wireless LAN communication device such as non-AP STA, or an AP, or both terms. A station for wireless communication includes a processor and a transceiver and according to the embodiment, may further include a user interface unit and a display unit. The processor may generate a frame to be transmitted through a wireless network or process a frame received through the wireless network and besides, perform various processing for controlling the station. In addition, the transceiver is functionally connected with the processor and transmits and receives frames through the wireless network for the station.

The access point (AP) is an entity that provides access to the distribution system (DS) via wireless medium for the station associated therewith. In the infrastructure BSS, communication among non-AP stations is, in principle, performed via the AP, but when a direct link is configured, direct communication is enabled even among the non-AP stations. Meanwhile, in the present invention, the AP is used as a concept including a personal BSS coordination point (PCP) and may include concepts including a centralized controller, a base station (BS), a node-B, a base transceiver system (BTS), and a site controller in a broad sense.

A plurality of infrastructure BSSs may be connected with each other through the distribution system (DS). In this case, a plurality of BSSs connected through the distribution system is referred to as an extended service set (ESS).

Figure 2:
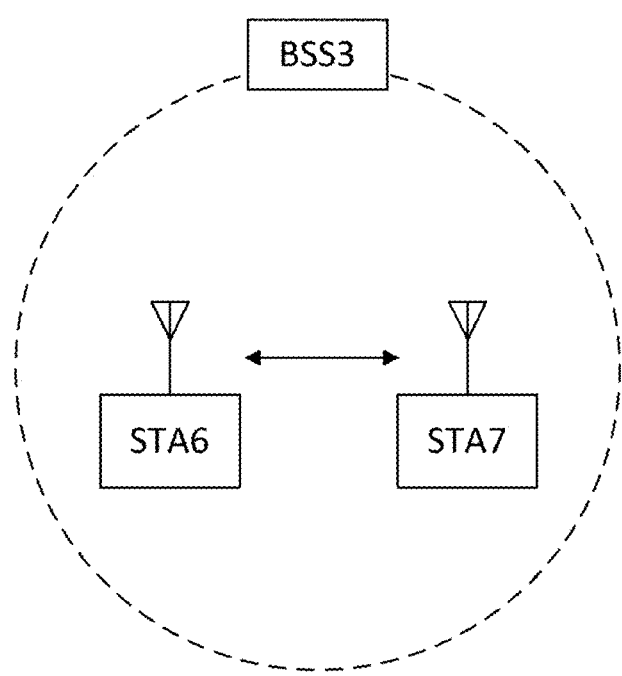
FIG. 2 is a view illustrating a wireless LAN system according to another embodiment of the present invention.

FIG. 2 illustrates an independent BSS which is a wireless LAN system according to another embodiment of the present invention. In the embodiment of FIG. 2, duplicative description of parts, which are the same as or correspond to the embodiment of FIG. 1, will be omitted.

Since a BSS3 illustrated in FIG. 2 is the independent BSS and does not include the AP, all stations STA6 and STA7 are not connected with the AP. The independent BSS is not permitted to access the distribution system and forms a self-contained network. In the independent BSS, the respective stations STA6 and STA7 may be directly connected with each other.

Figure 3:
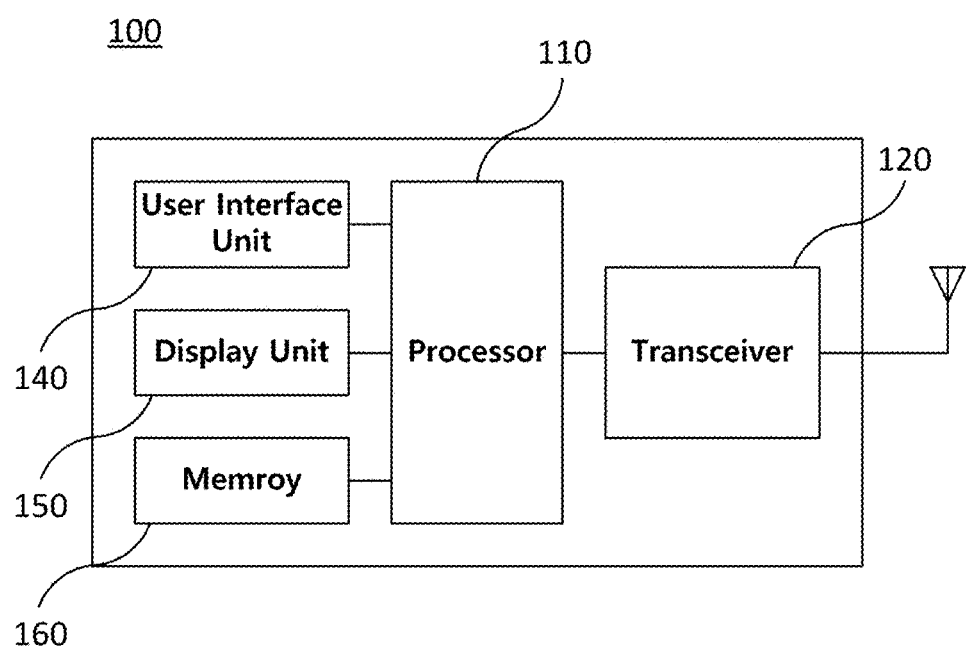
FIG. 3 is a block diagram illustrating a configuration of a station according to an embodiment of the present invention.

FIG. 3 is a block diagram illustrating a configuration of a station 100 according to an embodiment of the present invention.

As illustrated in FIG. 3, the station 100 according to the embodiment of the present invention may include a processor 110, a transceiver 120, a user interface unit 140, a display unit 150, and a memory 160.

First, the transceiver 120 transmits and receives a radio signal such as a wireless LAN packet, or the like and may be embedded in the station 100 or provided as an exterior. According to the embodiment, the transceiver 120 may include at least one transmit/receive module using different frequency bands. For example, the transceiver 120 may include transmit/receive modules having different frequency bands such as 2.4 GHz, 5 GHz, and 60 GHz. According to an embodiment, the station 100 may include a transmit/receive module using a frequency band of 6 GHz or more and a transmit/receive module using a frequency band of 6 GHz or less. The respective transmit/receive modules may perform wireless communication with the AP or an external station according to a wireless LAN standard of a frequency band supported by the corresponding transmit/receive module. The transceiver 120 may operate only one transmit/receive module at a time or simultaneously operate multiple transmit/receive modules together according to the performance and requirements of the station 100. When the station 100 includes a plurality of transmit/receive modules, each transmit/receive module may be implemented by independent elements or a plurality of modules may be integrated into one chip.

Next, the user interface unit 140 includes various types of input/output means provided in the station 100. That is, the user interface unit 140 may receive a user input by using various input means and the processor 110 may control the station 100 based on the received user input. Further, the user interface unit 140 may perform output based on a command of the processor 110 by using various output means.

Next, the display unit 150 outputs an image on a display screen. The display unit 150 may output various display objects such as contents executed by the processor 110 or a user interface based on a control command of the processor 110, and the like. Further, the memory 160 stores a control program used in the station 100 and various resulting data. The control program may include an access program required for the station 100 to access the AP or the external station.

The processor 110 of the present invention may execute various commands or programs and process data in the station 100. Further, the processor 110 may control the respective units of the station 100 and control data transmission/reception among the units. According to the embodiment of the present invention, the processor 110 may execute the program for accessing the AP stored in the memory 160 and receive a communication configuration message transmitted by the AP. Further, the processor 110 may read information on a priority condition of the station 100 included in the communication configuration message and request the access to the AP based on the information on the priority condition of the station 100. The processor 110 of the present invention may represent a main control unit of the station 100 and according to the embodiment, the processor 110 may represent a control unit for individually controlling some component of the station 100, for example, the transceiver 120, and the like. The processor 110 controls various operations of radio signal transmission/reception of the station 100 according to the embodiment of the present invention. A detailed embodiment thereof will be described below.

The station 100 illustrated in FIG. 3 is a block diagram according to an embodiment of the present invention, where separate blocks are illustrated as logically distinguished elements of the device. Accordingly, the elements of the device may be mounted in a single chip or multiple chips depending on design of the device. For example, the processor 110 and the transceiver 120 may be implemented while being integrated into a single chip or implemented as a separate chip. Further, in the embodiment of the present invention, some components of the station 100, for example, the user interface unit 140 and the display unit 150 may be optionally provided in the station 100.

Figure 4:
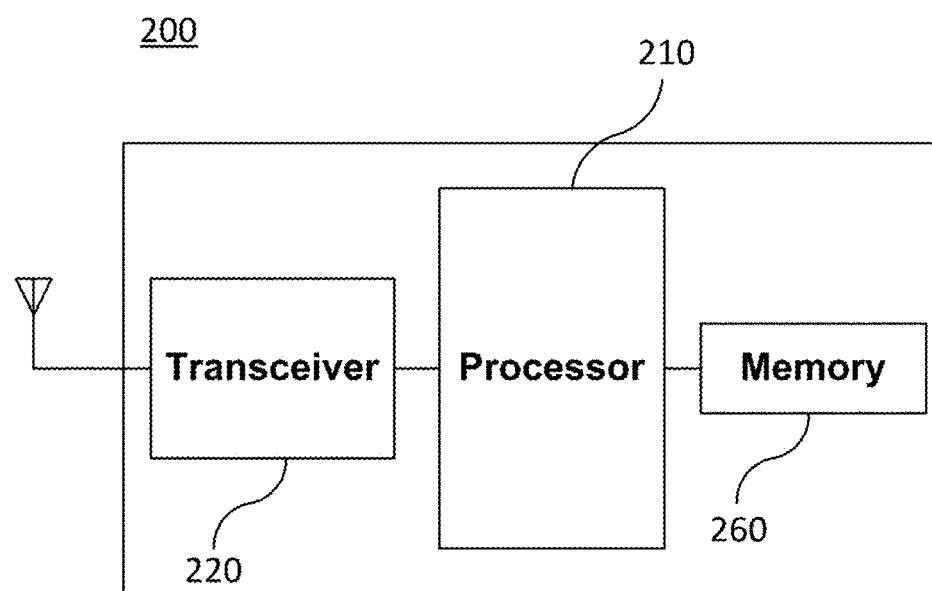
FIG. 4 is a block diagram illustrating a configuration of an access point according to an embodiment of the present invention.

FIG. 4 is a block diagram illustrating a configuration of an AP 200 according to an embodiment of the present invention.

As illustrated in FIG. 4, the AP 200 according to the embodiment of the present invention may include a processor 210, a transceiver 220, and a memory 260. In FIG. 4, among the components of the AP 200, duplicative description of parts which are the same as or correspond to the components of the station 100 of FIG. 2 will be omitted.

Referring to FIG. 4, the AP 200 according to the present invention includes the transceiver 220 for operating the BSS in at least one frequency band. As described in the embodiment of FIG. 3, the transceiver 220 of the AP 200 may also include a plurality of transmit/receive modules using different frequency bands. That is, the AP 200 according to the embodiment of the present invention may include two or more transmit/receive modules among different frequency bands, for example, 2.4 GHz, 5 GHz, and 60 GHz together. Preferably, the AP 200 may include a transmit/receive module using a frequency band of 6 GHz or more and a transmit/receive module using a frequency band of 6 GHz or less. The respective transmit/receive modules may perform wireless communication with the station according to a wireless LAN standard of a frequency band supported by the corresponding transmit/receive module. The transceiver 220 may operate only one transmit/receive module at a time or simultaneously operate multiple transmit/receive modules together according to the performance and requirements of the AP 200.

Next, the memory 260 stores a control program used in the AP 200 and various resulting data. The control program may include an access program for managing the access of the station. Further, the processor 210 may control the respective units of the AP 200 and control data transmission/reception among the units. According to the embodiment of the present invention, the processor 210 may execute the program for accessing the station stored in the memory 260 and transmit communication configuration messages for one or more stations. In this case, the communication configuration messages may include information about access priority conditions of the respective stations. Further, the processor 210 performs an access configuration according to an access request of the station. The processor 210 controls various operations such as radio signal transmission/reception of the AP 200 according to the embodiment of the present invention. A detailed embodiment thereof will be described below.

Figure 5:
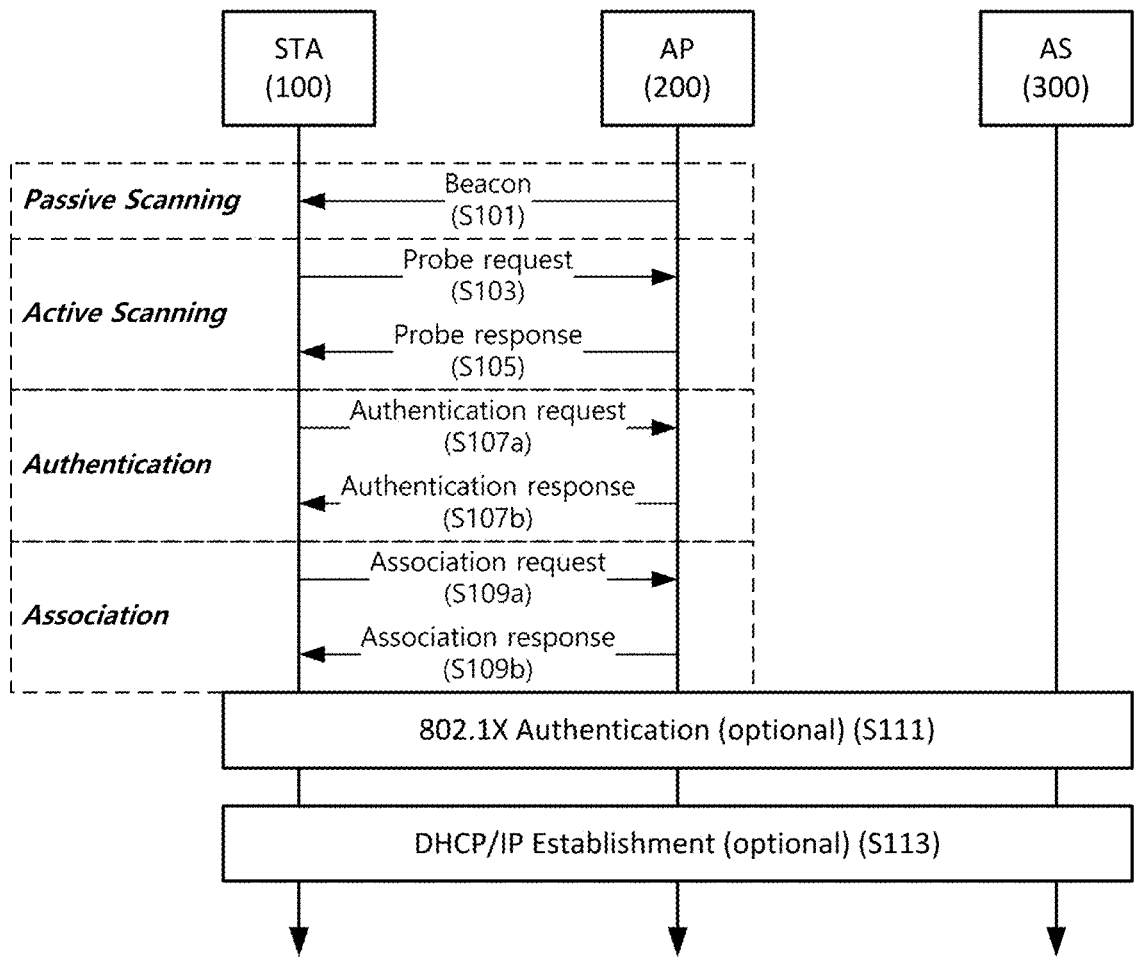
FIG. 5 is a view illustrating a process that a station sets an access point and a link according to an embodiment of the present invention.

FIG. 5 is a diagram schematically illustrating a process in which a STA sets a link with an AP.

Referring to FIG. 5, the link between the STA 100 and the AP 200 is set through three steps of scanning, authentication, and association in a broad way. First, the scanning step is a step in which the STA 100 obtains access information of BSS operated by the AP 200. A method for performing the scanning includes a passive scanning method in which the AP 200 obtains information by using a beacon message (S101) which is periodically transmitted and an active scanning method in which the STA 100 transmits a probe request to the AP (S103) and obtains access information by receiving a probe response from the AP (S105).

The STA 100 that successfully receives wireless access information in the scanning step performs the authentication step by transmitting an authentication request (S107*a*) and receiving an authentication response from the AP 200 (S107*b*). After the authentication step is performed, the STA 100 performs the association step by transmitting an association request (S109*a*) and receiving an association response from the AP 200 (S109*b*).

Meanwhile, an 802.1X based authentication step (S111) and an IP address obtaining step (S113) through DHCP may be additionally performed. In FIG. 5, the authentication server 300 is a server that processes 802.1X based authentication with the STA 100 and may be present in physical association with the AP 200 or present as a separate server.

When data is transmitted using an orthogonal frequency division modulation or multi-input multi-output (MIMO) manner, any one wireless communication terminal may simultaneously transmit data to a plurality of wireless communication terminals. In addition, the any one wireless communication terminal may simultaneously receive data from the plurality of wireless communication terminals. To this end, the any one wireless communication terminal may transmit a method capable of accessing itself to the plurality of wireless communication terminals. The plurality of wireless communication terminals may access the any one wireless communication terminal on the basis of the access method having been transmitted by the any one wireless communication terminal. An embodiment of the present invention in which the plurality of wireless communication terminals access the any one wireless communication terminal and on the basis of such an access and the plurality of wireless communication terminals transmit data to the any one wireless communication terminal will be described through drawings after FIG. 5 and descriptions thereabout.

For convenience of description, the any one wireless communication communicating with the plurality of wireless communication terminals is referred to as a first wireless communication terminal, and the plurality of wireless communication terminals simultaneously communicating with the first wireless communication terminal are referred to as second wireless communication terminals. In addition, the first wireless communication terminal may be referred to as a base wireless communication terminal. Furthermore, the first wireless communication terminal may be a wireless communication terminal performing allocation and scheduling on a communication medium resource in communications with the plurality of wireless communication terminals. In detail, the first wireless communication terminal may perform a cell coordinator role. At this point, the first wireless communication terminals may be an access point 200. In addition, the second wireless communication terminal may be a station 100 associated with the access point 200. In a detailed embodiment, the first wireless communication terminal may be a wireless communication terminal performing allocation and scheduling on a communication medium resource in an independent network that is not connected to an external distribution service such as an ad-hoc network. Furthermore, the first wireless communication terminal may be at least any one of a base station, an eNB, and a transmission point (TP).

Figure 6:
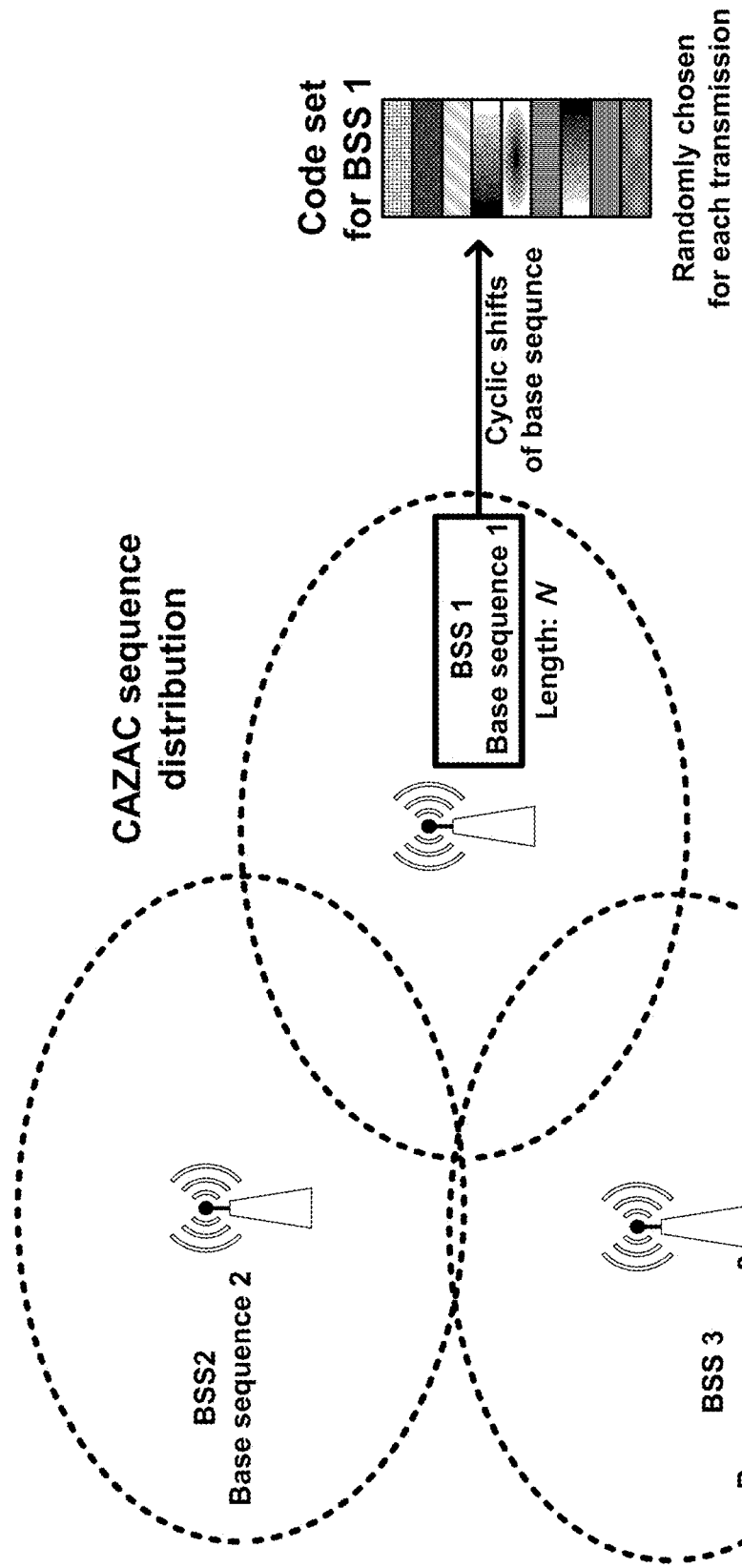
FIG. 6 shows that an access point according to an embodiment of the present invention generates an orthogonal code set for a random access.

FIG. 6 shows that an access point according to an embodiment of the present invention generates an orthogonal code set for a random access.

The first wireless communication terminal may designate a plurality of access manners through which the plurality of second wireless communication terminals may access using a certain communication manner. The second wireless communication terminal may access the first wireless communication terminal through any one of the designated plurality of access manners. In detail, the first wireless communication terminal may designate an orthogonal code set accessible by the plurality of second wireless communication terminals. Accordingly, the second wireless communication terminals may access the first wireless communication terminal using any one orthogonal code in the orthogonal code set. In detailed embodiment, a base sequence that is different from an adjacent BSS is allocated to a BSS. For example, a plurality of base sequences may be respectively allocated to a plurality of BSSes. The first and second wireless communication terminals in each of the plurality of BSSes generate a plurality of orthogonal codes included in the orthogonal code set on the basis of the allocated base sequence. In detail, the first and second wireless communication terminals generate a plurality of orthogonal codes included in the orthogonal code set by cyclic-shifting the allocated base sequence. In detail, the first and second wireless communication terminals may receive an index indicating the base sequence. At this point, the first and second wireless communication terminals may acquire the base sequence according to the index indicating the base sequence. Thereafter, the first and second wireless communication terminals may generate the plurality of orthogonal codes included in the code set using the acquired base sequence according to the pre-designated length of the base sequence and a cyclic-shifting size. When the BSS uses 8 channels of a 20 MHz unit, the number of the base sequence lengths may be equal to or greater than 8. For stable zero auto-correlation characteristics, the base sequence may be lengthened. Through this, the first and second wireless communication terminals may minimize base sequence interference between adjacent BSSes. In a detailed embodiment, the first and second wireless communication terminals may generate a base sequence by using a Zadoff-Chu sequence satisfying constant amplitude zero auto correlation (CAZAC) characteristics.

The second wireless communication terminal may randomly select to use any one of a plurality of access manners designated by the first wireless communication terminal. In detail, the second wireless communication terminal may randomly select any one of the generated orthogonal code sets to use as a multiple-access code. In another detailed embodiment, the second wireless communication terminal may use a fixed orthogonal code. At this point, the fixed orthogonal code may be obtained by modulo-operating an identifier of the second wireless communication terminal with the size of the orthogonal code set. At this point, the identifier of the second wireless communication terminal may be an AID for identifying an association of the first and second wireless communication terminals. The plurality of second wireless communication terminals maintain orthogonality between orthogonal codes, even if accessing through different orthogonal codes. Accordingly, the first wireless communication terminal may know, through an autocorrelation operation for the base sequence, which code the second wireless communication terminal uses in an access. In particular, in a case where the CAZAC sequence is used, when the base sequence length becomes longer, the number of codes included in the code set increases. Accordingly, a probability that codes overlap between wireless communication terminals becomes reduced. A description about that the first wireless communication terminal decodes a received signal to acquire a code will be provided in relation to FIGS. 7 and 8.

Figure 7:
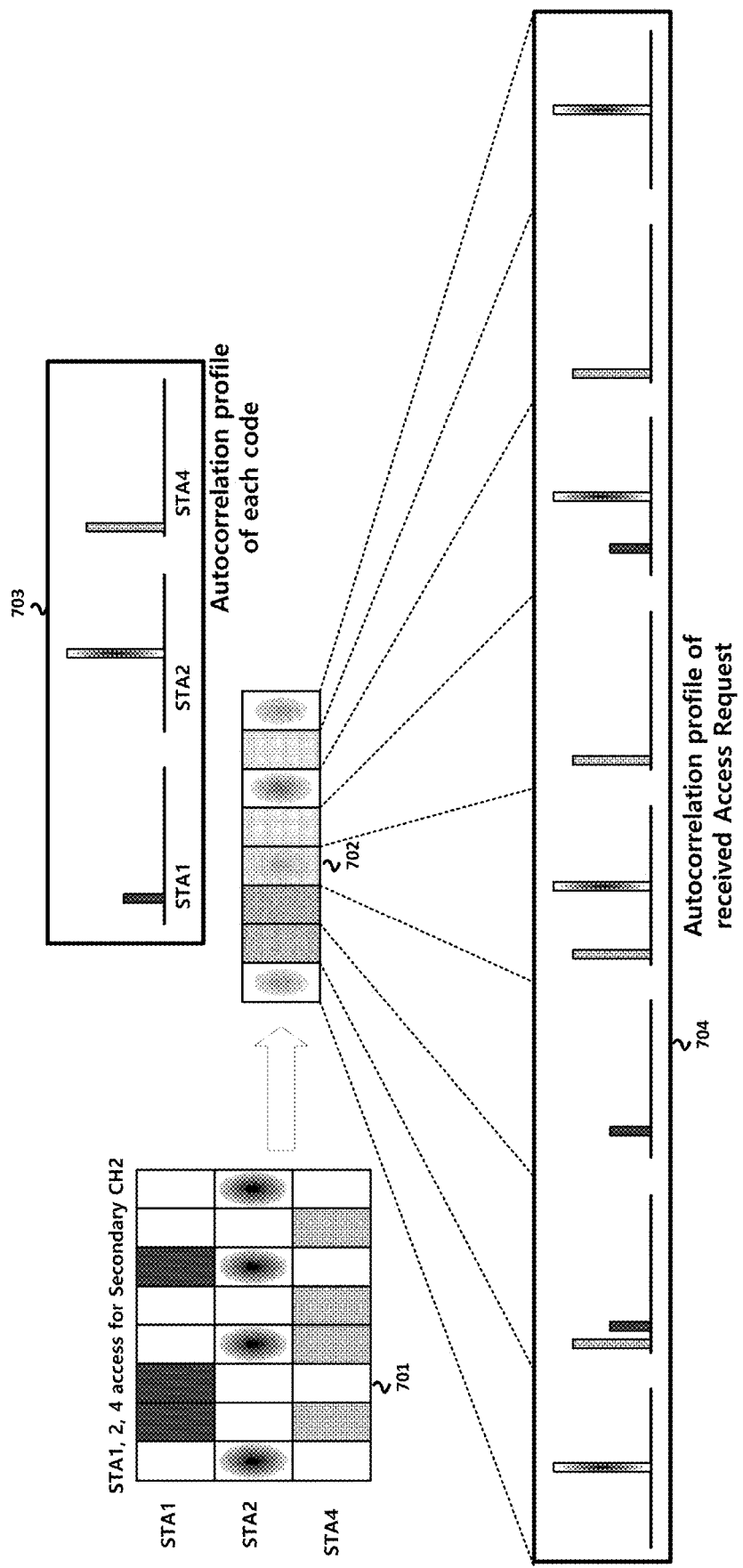
FIG. 7 shows that a wireless communication terminal according to an embodiment of the present invention decodes a signal based on an orthogonal code set for a random access.

FIG. 7 shows that a wireless communication terminal according to an embodiment of the present invention decodes a signal based on an orthogonal code set for a random access.

When the plurality of second wireless communication terminals simultaneously access the first wireless communication terminal, the first wireless communication terminal receives signals in a type that respective signals from the plurality of second wireless communication terminals are added. At this point, the plurality of first wireless communication terminals perform autocorrelation operations to obtain patterns of codes respectively corresponding to the plurality of signals. Through this, the first wireless communication terminal may identify the second wireless communication terminals having transmitted the respective signals. In addition, the first wireless communication terminal may obtain information included in each of the signals In the embodiment of FIG. 7, a first station STA1, a second station STA2, and a fourth station STA4 access the first wireless communication terminal through a secondary channel CH2. At this point, the first station STA1, the second station STA2, and the fourth station STA4 access an access point using different orthogonal codes 701. At this point, the first station STA1, the second station STA2, and the fourth station STA4 may use the orthogonal codes respectively pre-designated thereto. In another detailed embodiment, the first station STA1, the second station STA2, and the fourth station STA4 may randomly select any one orthogonal code from the code set including the plurality of orthogonal codes. Accordingly, the access point receives a signal 702 in which a signal from the first station STA1, a signal from the second station STA2 and a signal from the fourth station STA4 are added. At this point, respective orthogonal codes used by the first station STA1, the second station STA2 and the fourth station STA4 have different shift positions 703 of the auto-correlation. Accordingly, the access point performs the auto-correlation operation on the received signal and acquires orthogonal code patterns 704 respectively corresponding to the first station STA1, the second station STA2 and the fourth station STA4 having different shift positions from each other. Accordingly, the access point may identify a station having transmitted the signal and acquire information included in the signal.

Figure 8:
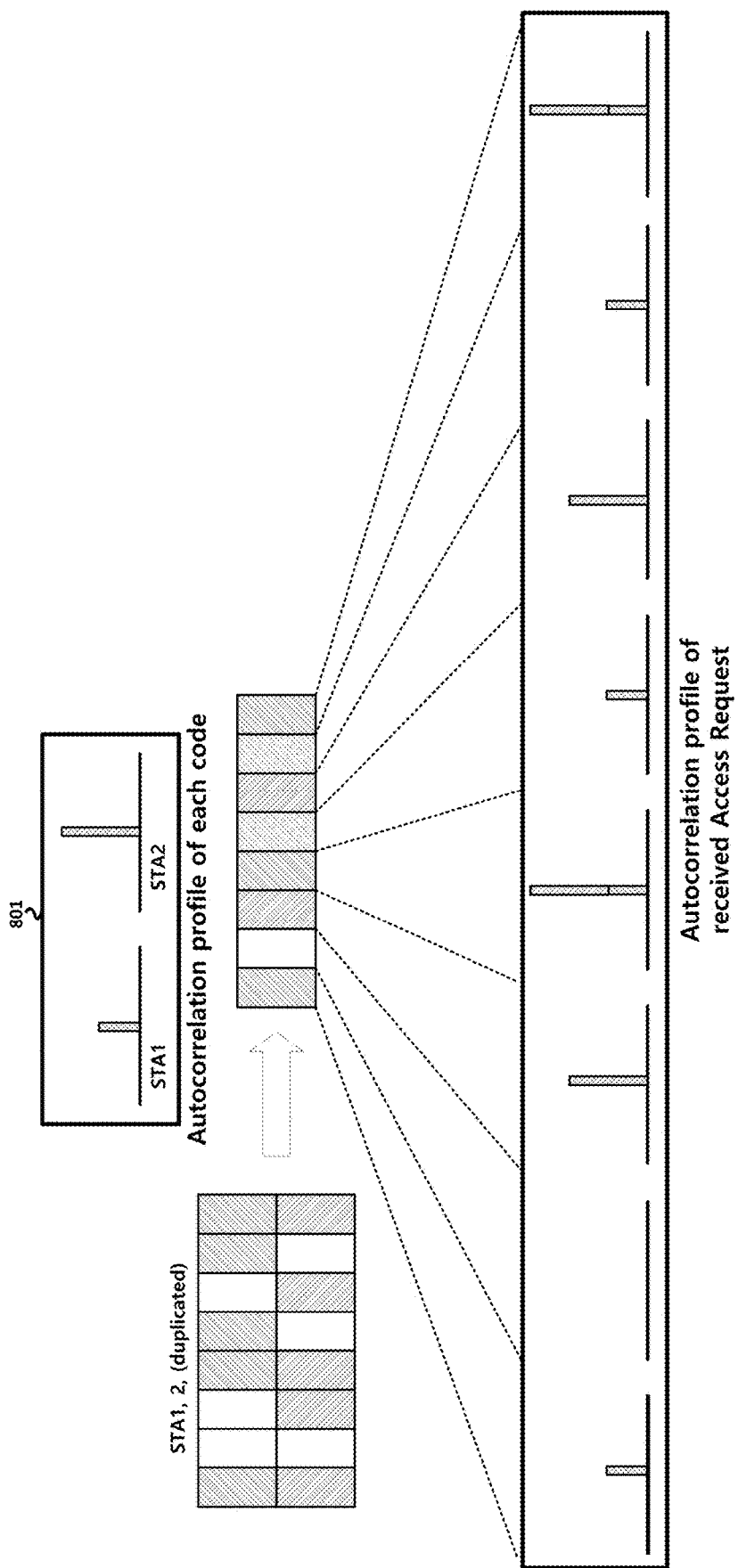
FIG. 8 shows that a wireless communication terminal according to an embodiment of the present invention decodes a plurality of signals based on an identical orthogonal code set for the random access.

FIG. 8 shows that a wireless communication terminal according to an embodiment of the present invention decodes a plurality of signals based on an identical orthogonal code set for the random access.

When a random access through the orthogonal code is allowed, even a case where the plurality of second wireless communication terminals access through an identical orthogonal code, the plurality of second wireless communication terminals may be identified. In detail, the first wireless communication terminal performs auto-correlation on a received signal to acquire an orthogonal code pattern. At this point, even when the plurality of second wireless communication terminals use an identical orthogonal code, when distances between the first wireless communication terminal and the plurality of second wireless communication terminals are different, peak values of orthogonal code patterns of the plurality of second wireless communication terminals may show identifiably large differences. Accordingly, even when the plurality of second wireless communication terminals select the identical orthogonal code, the first wireless communication terminal may identify signals having been respectively transmitted from the plurality of second wireless communication terminals. However, when respective distances between the first wireless communication terminal and the plurality of second wireless communication terminals are similar to each other and then the peak values of the orthogonal code patterns are not identifiable, the first wireless communication terminal may not identify respective signals having been received from the plurality of second wireless communication terminals. At this point, the first wireless communication terminal may treat the signals having been received from the plurality of second wireless communication terminals as being collided.

In the embodiment of FIG. 8, a first station and a second station transmit signals using an identical orthogonal code to an access point. The access point performs an auto-correlation operation on received signals to acquire an orthogonal code 801 used by the first and second stations. At this point, since a peak value of the orthogonal code pattern from the first station differs from a peak value of the orthogonal code pattern from the second station, the access point may identify the orthogonal code patterns of the first and second stations.

In this way, when the second wireless communication terminal performs a multiple access using the orthogonal code value, even when the plurality of second wireless communication terminals use an identical orthogonal code, there is a possibility that orthogonal code patterns of the signals having been received from the plurality of second wireless communication terminals are identified. Unlike this, when the second wireless communication terminal performs a multiple access in an orthogonal frequency divisional multiple access (OFDMA) scheme and the plurality of second wireless communication terminals use an identical frequency band, the first wireless communication terminal may not receive a signal transmitted from the second wireless communication terminal. Accordingly, in view of signal identification, the multiple access through the orthogonal code may be more efficient than the multiple access through the OFDMA. In particular, like a random multiple access, when there is a concern that the plurality of second wireless communication terminals access the first wireless communication terminal in an identical manner, the multiple access through the orthogonal code may be more efficient than the multiple access through the OFDMA.

When the second wireless communication terminal accesses the first wireless communication terminal by using the orthogonal code, a detailed signal format used by the second wireless communication terminal will be described in relation to FIGS. 9 and 10.

Figure 9:
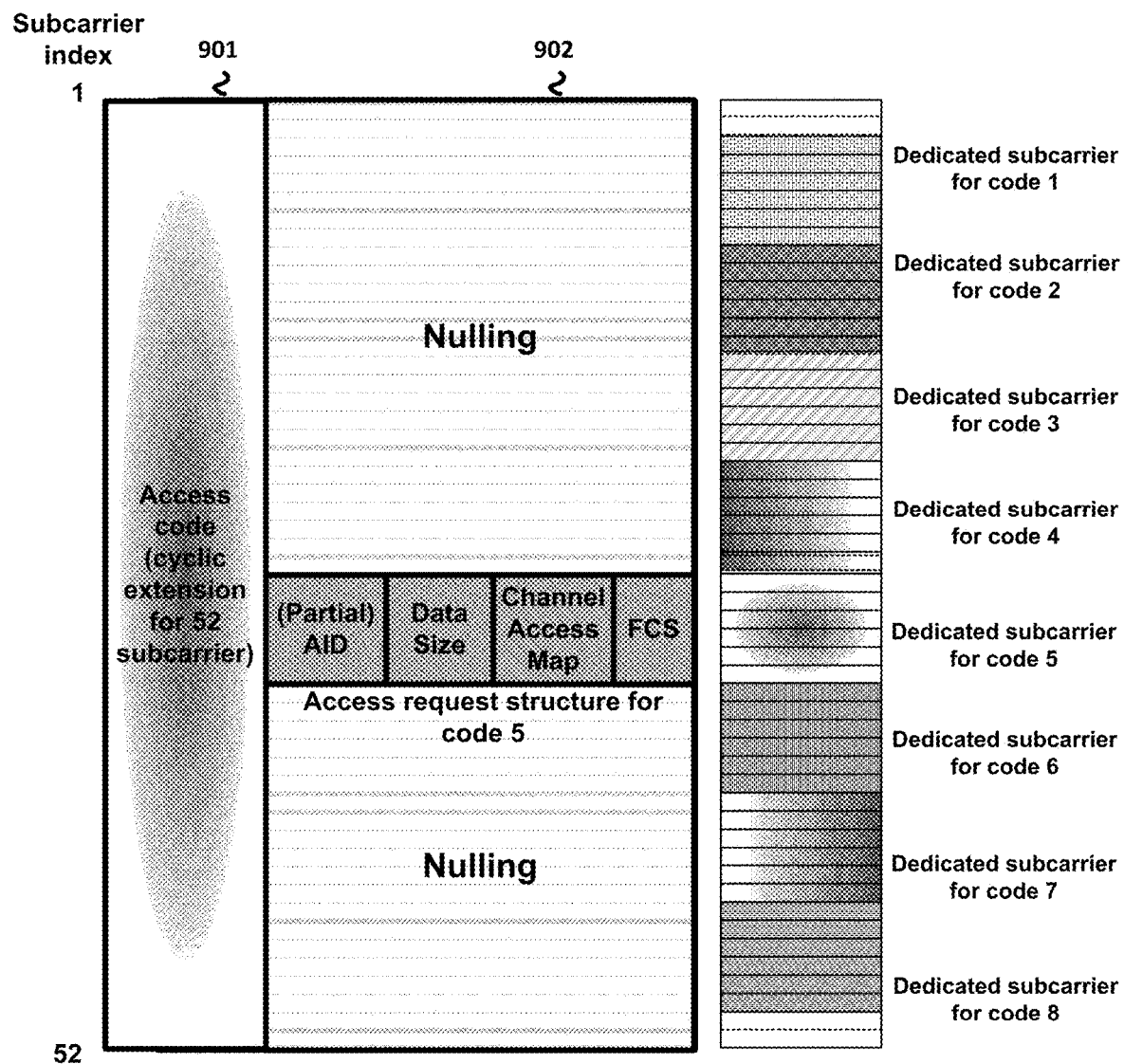
FIG. 9 shows a structure of an access signal according to an embodiment of the present invention.

FIG. 9 shows a structure of an access signal according to an embodiment of the present invention.

An access signal transmitted by the second wireless communication terminal to the first wireless communication terminal may include a code part 901 including information on an orthogonal code and a data part 902 including information other than the orthogonal code.

All subcarriers in a frequency band of the code part 901 may carry the orthogonal code selected by the second wireless communication terminal. In detail, the second wireless communication terminal may transmit, to the first wireless communication terminal, the code selected by the second wireless communication terminal through the all subcarriers in the code part 901. When a frequency bandwidth of the code part 901 is 20 MHz and the second wireless communication terminal performs communication using 64-point Fast Fourier transform (FFT), the second wireless communication terminal may transmit the code selected by the second wireless communication terminal using 52 subcarriers in the code part 901. Through this, the code part 901 performs a role of a training sequence enabling a channel state of each terminal to be known, while performing a role of a preamble. In addition, in a detailed embodiment, the duration of the code part may be pre-designated.

In addition, a specific subcarrier in the data part 902 may transmit information other than the orthogonal code. At this point, the specific subcarrier may be a subcarrier allocated to the orthogonal code transmitted by the code part 901. In this case, the first wireless communication terminal may acquire the orthogonal code from the code part 901 and acquire information included in the data part 902 from the subcarrier and frequency band allocated to the corresponding orthogonal code.

In detail, when the second wireless communication terminal directly transmits data through a random access, the data part 902 may include data to be transmitted by the second wireless communication terminal. In another detailed embodiment, when the second wireless communication terminal transmits required information for being allocated with a channel and then transmits data, the data part 902 may include the required information for being allocated with the channel. In detail, the data part 902 may include an identifier for identifying the second wireless communication terminal. At this point, the identifier may be an association ID (AID) for identifying association with the first wireless communication terminal. In a detailed embodiment, the identifier may be a partial AID. In addition, the data part 902 may include information on a buffer status. In detail, the data part 902 may include data size information indicating the size of data to be transmitted to the first wireless communication terminal by the second wireless communication terminal. In addition, the data part 902 may include channel access information indicating a channel to be used for an access by the second wireless communication terminal.

In the embodiment of FIG. 9, the code part 901 transmits a fifth code through 52 subcarriers. In addition, the data part 902 transmits, through the subcarriers allocated to the fifth code, FCS values indicating an AID, the size of data to be transmitted from the second wireless communication terminal to the first wireless communication terminal, channel information with which the second wireless communication terminal seeks to be allocated, and whether to include an error of the data.

As described above, each of the plurality of second wireless communication terminals may use a fixed code allocated thereto. In this case, the first wireless communication terminal acquires the orthogonal code to identify which of the second wireless communication terminals transmits the corresponding signal. Accordingly, in this case, a structure of an access signal transmitted from the second wireless communication terminal to the first wireless communication terminal becomes simpler. A description thereabout will be provided in relation to FIG. 10.

Figure 10:
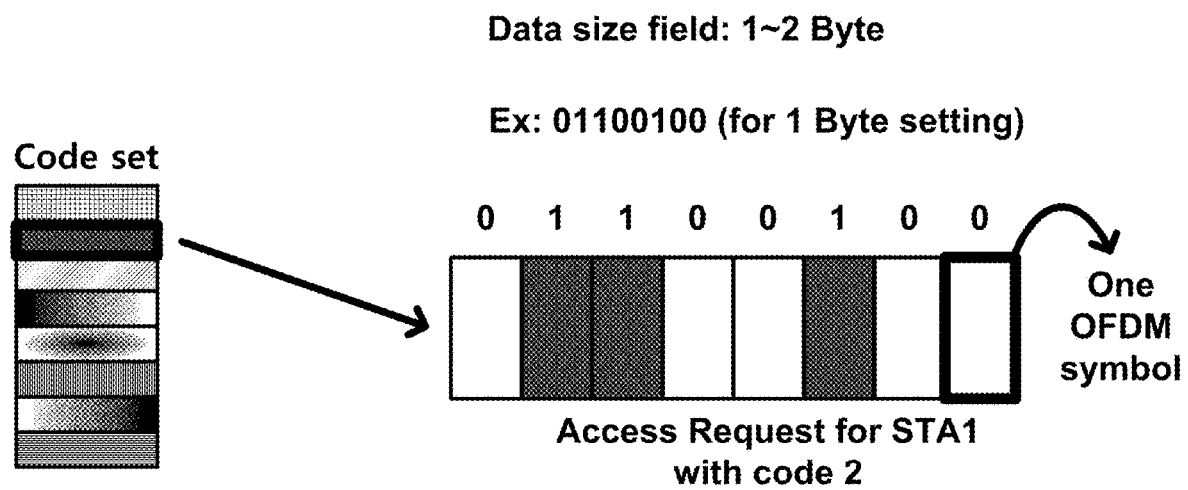
FIG. 10 shows a structure of the access signal according to another embodiment of the present invention.

FIG. 10 shows a structure of the access signal according to another embodiment of the present invention.

The access signal transmitted from the second wireless communication terminal to the first wireless communication terminal may include information indicating the size of data to be transmitted from the second wireless communication terminal to the first wireless communication terminal. In addition, the access signal may be a signal in which the orthogonal code used by the first wireless communication terminal is patterned by a symbol unit. In detail, whether each of a plurality of OFDM symbols included in the access signal includes an orthogonal code may indicate the size of data to be transmitted from the second wireless communication terminal to the first wireless communication terminal. For example, for each OFDM symbol included in the access signal, whether the corresponding symbol includes the orthogonal code may indicate each binary bit value indicating the size of data to be transmitted to the first wireless communication terminal. At this point, when the OFDM symbol included in the access signal includes the orthogonal code, it may be indicated that a binary bit value corresponding to an order in which the OFDM symbol is positioned is 1. In addition, when the OFDM symbol included in the access signal includes a Null value, it may be indicated that a binary bit value corresponding to an order in which the OFDM symbol is positioned is 0.

Furthermore, the frequency bandwidth is 20 MHz, and when the second wireless communication terminal uses 64-point FFT, the second wireless communication terminal may transmit the access signal using 52 subcarriers.

In the embodiment of FIG. 10, the second wireless communication terminal transmits the access signal to the first wireless communication terminal using a second code. At this point, the size of data that the second wireless communication terminal seeks to transmit to the first wireless communication terminal is 100 (01100100b). Accordingly, the second wireless communication terminal inserts the second code to second, third, and sixth OFDM symbols of the access signal to be transmitted to the first wireless communication terminal and inserts a Null value to the remaining OFDM symbols.

In order to allow the plurality of second wireless communication terminals to simultaneously attempt an access, the first wireless communication terminal assigns a time to attempt the access to the plurality of second wireless communication terminals and signals the time to the plurality of second wireless communication terminals. At this point, the second wireless communication terminals may transmit, at the assigned time, required information for being allocated with a channel or directly transmit data to the first wireless communication terminal. In relation to FIGS. 11 and 12, an embodiment in which the first wireless communication terminal signals an uplink access time to the second wireless communication terminals will be described.

Figure 11:
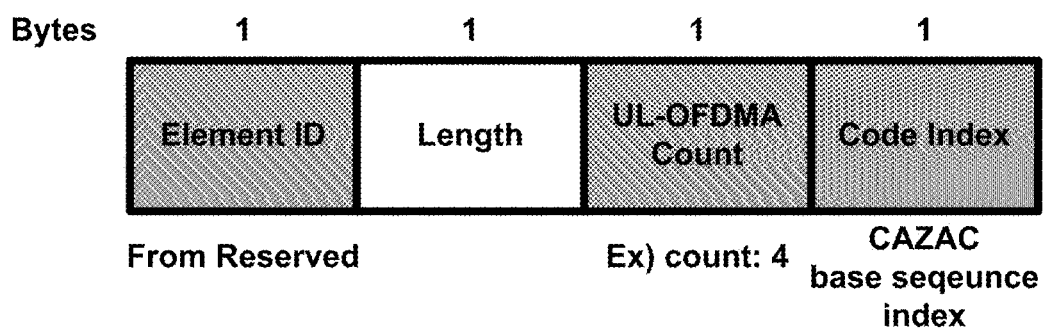
FIG. 11 shows a frame including information on the orthogonal code set for the random access according to an embodiment of the present invention.

FIG. 11 shows a frame including information on the orthogonal code set for the random access according to an embodiment of the present invention.

The first wireless communication terminal may transmit, to the second wireless communication terminal, a frame including information required for an access to the first wireless communication terminal. In detail, the first wireless communication terminal may transmit a frame including at least any one of information indicating an access time thereto and information on an access manner thereto. At this point, the information indicating the access time thereto may be an access period. For example, the first wireless communication terminal may transmit a frame including information indicating the number of transmission times to the second wireless communication terminal. At this point, the second wireless communication terminal may attempt an access to the first wireless communication terminal in a period obtained by equally dividing a frame transmission period by the number of transmission times. In addition, the information on the access manner may be information on the orthogonal code used for the access. In detail, the information on the orthogonal code may be information indicating a base sequence capable of generating the orthogonal code. At this point, the information indicating the base sequence may be a sequence index.

In a detailed embodiment, the first wireless communication terminal may include at least any one of information indicating an uplink access time and information on an uplink access manner in a beacon frame, and transmit the beacon frame. In detail, as in the embodiment of FIG. 9, the beacon frame may include a UL-OFDMA count field indicating an uplink transmission times in a transmission period of the beacon frame. In detail, the second wireless communication terminal may acquire a value obtained by dividing the transmission period of the beacon frame by the UL-OFDMA count field value. The second wireless communication terminal may access the first wireless communication terminal in an access time period of the acquired value. In addition, the beacon frame may include a code index field indicating a code capable of generating a CAZAC base sequence. In detail, the beacon frame may include, as information elements, the UL-OFDMA count field and the code index field. At this point, a value of an element ID field indicating an element identifier may be a reserved value in existing 802.11 standards.

Figure 12:
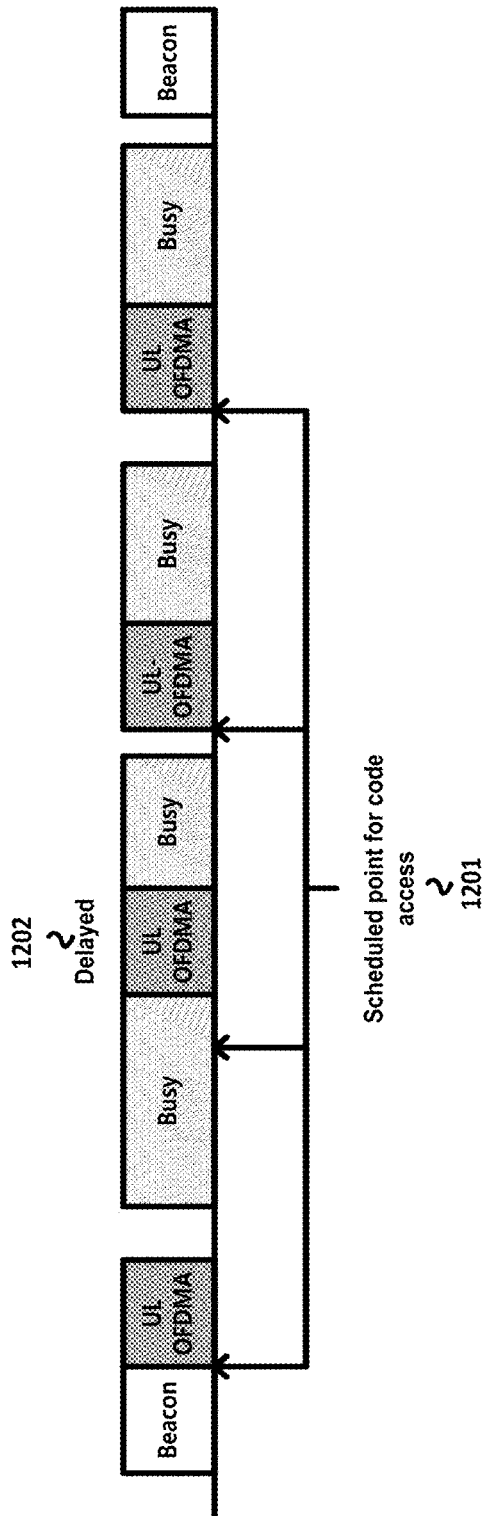
FIG. 12 shows that a wireless communication terminal according to an embodiment of the present invention performs the random access on the basis of a frame including information on the orthogonal code set for the random access.

FIG. 12 shows that a wireless communication terminal according to an embodiment of the present invention performs the random access on the basis of a frame including information on the orthogonal code set for the random access.

The second wireless communication terminal may periodically access the first wireless communication terminal. At this point, as described above, the second wireless communication terminal may periodically access the first wireless communication terminal according to an access period designated by the first wireless communication terminal. In a detailed embodiment, when a channel, which will be used by the second wireless communication terminal in order to access the first wireless communication terminal at the designated time, is used by another wireless communication terminal, the second wireless communication terminal may wait until the corresponding channel becomes an idle state. Thereafter, when the corresponding channel becomes the idle state, the second wireless communication terminal may attempt an access to the first wireless communication terminal.

At this point, the second wireless communication terminals may access the first wireless communication terminal to transmit required information for being allocated with a channel or directly transmit data thereto. The required information for being allocated with the channel may include information on a buffer state of the second wireless communication terminal. At this point, the information on the buffer state may include at least any one of whether there is data to be currently transmitted and the size of data to be transmitted.

In the embodiment of FIG. 12, the first wireless communication terminal transmits a beacon frame.

The second wireless communication terminal acquires information on an access period from the beacon frame.

The second wireless communication terminal attempts an access at every three access times 1201 according to the information on the transmission period. However, like a second access time, when a channel to which an access is attempted is not in an idle state but in a busy state, the second wireless communication terminal waits until the channel becomes the idle state. When the channel becomes the idle state, the second wireless communication terminal accesses 1202 the first wireless communication terminal.

As described above, the second wireless communication terminal may transmit the required information for being allocated with the channel before transmitting data to the first wireless communication terminal. At this point, the first wireless communication terminal may allocate a channel to the second wireless communication terminal on the basis of the required information for being allocated with the channel. For example, the first wireless communication terminal may allocate respective channels to be used by the plurality of second wireless terminals to the plurality of second wireless terminals in consideration of respective buffer states of the plurality of second wireless communication terminals. At this point, since the plurality of second wireless communication terminals use channels allocated thereto, collisions may be prevented due to transmissions by the plurality of second wireless communication terminals. Accordingly, the second wireless communication terminals may transmit, to the first wireless communication terminal, data more stably and efficiently than a direct transmission case. In relation to FIGS. 12 to 19, it will be provided a detailed description about data transmission by the second wireless communication terminal to the first wireless communication terminal, after the second wireless communication terminal transmits the second wireless communication terminal's buffer state.

Figure 13:
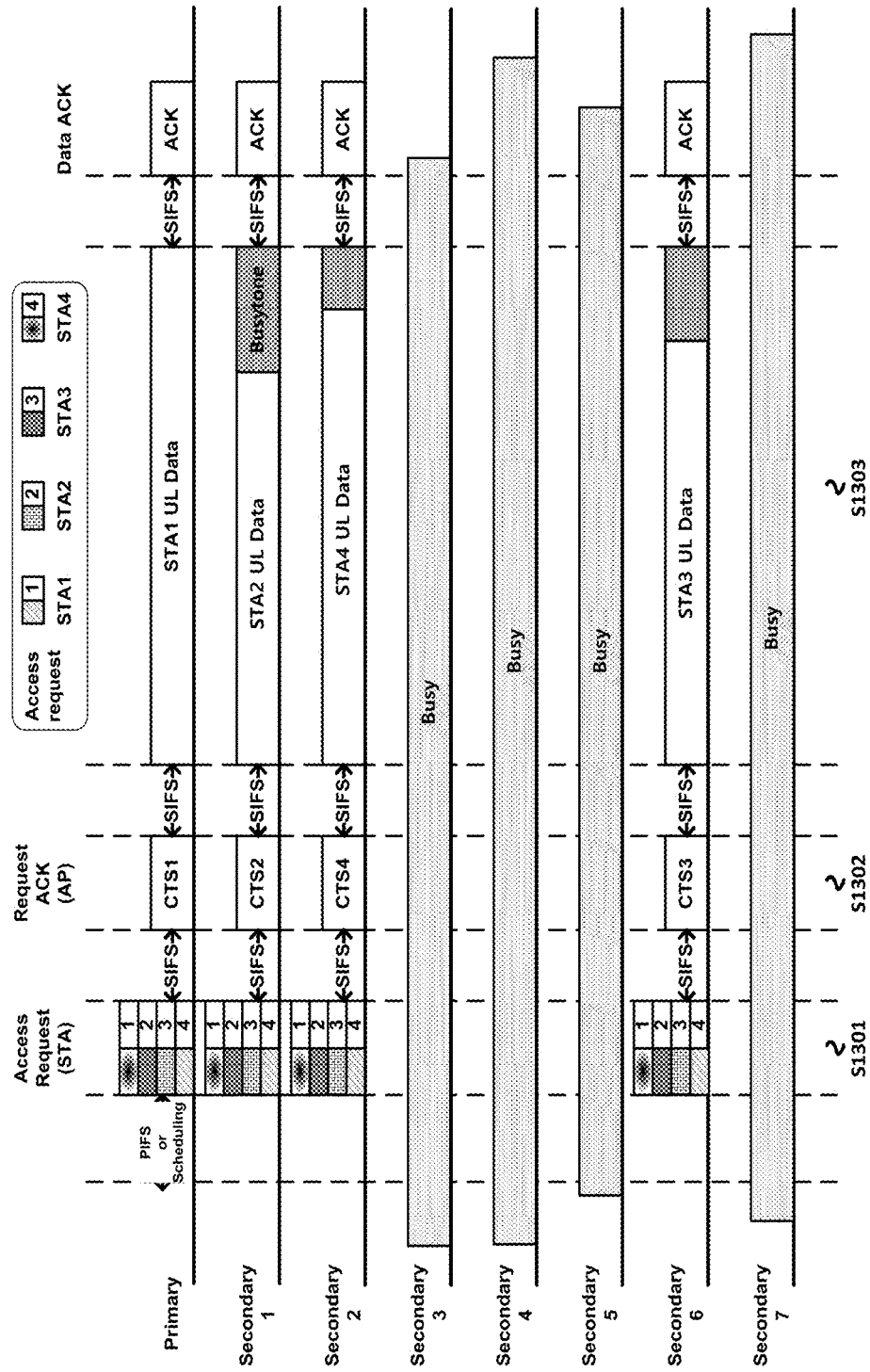
FIG. 13 shows that a plurality of stations according to an embodiment of the present invention transmit data to an access point through the random access.

FIG. 13 shows that a plurality of stations according to an embodiment of the present invention transmit data to an access point through the random access.

The second wireless communication terminal transmits required information for being allocated with the second wireless communication terminal's channel to the first wireless communication terminal. In detail, the second wireless communication terminal may transmit the required information for being allocated with the second wireless communication terminal's channel using any one orthogonal code in a code set including a plurality of orthogonal codes. At this point, as described above, the orthogonal code set may be generated based on the information transmitted from the first wireless communication terminal. For example, the second wireless communication terminal may receive, from the first wireless communication terminal, a frame including information on the orthogonal code set. At this point, the second wireless communication terminal may acquire an orthogonal code on the basis of the information on the orthogonal code set. In another detailed embodiment, the second wireless communication terminal may transmit its own buffer state using the orthogonal code allocated in advance to the second wireless communication terminal. At this point, the first wireless communication terminal may allocate the orthogonal code corresponding to the second wireless communication terminal as an association identifier for identifying association of the second wireless communication terminal with the first wireless communication terminal. At this point, the association identifier may be an AID. In this case, the second wireless communication terminal may transmit the required information for being allocated with the channel using the association identifier as the orthogonal code.

In addition, the second wireless communication terminal may transmit the required information for being allocated with the channel before transmitting data to the first wireless communication terminal at the designated time. At this point, the determined time may be a time designated by the first wireless communication terminal as described in relation to FIGS. 11 and 12. In a detailed embodiment, the second wireless communication terminal may acquire the designated time on the basis of a beacon frame transmitted by the first wireless communication terminal.

In addition, the second wireless communication terminal may transmit the required information for being allocated with the channel to the first wireless communication terminal, after a predetermined time passes from a transmission time of a frame that has been transmitted before. At this point, the predetermined time may be a point inter-frame space (PIFS) defined in 802.11 standards.

The first wireless communication terminal may allocate a channel to each of the plurality of second wireless communication terminals on the basis of the received required information for being allocated with the channel.

At this point, as described above, the required information for being allocated with the channel may include information indicating the size of data to be transmitted by the second wireless communication terminal. In addition, the required information for being allocated with the channel may include an identifier for identifying the second wireless communication terminal. At this point, the identifier for identifying the second wireless communication terminal may be an AID or a partial AID for identifying an association with the first wireless communication terminal. In addition, the required information for being allocated with the channel may include channel access map information indicating a channel with which the second wireless communication terminal desires to be allocated. At this point, the channel access map information may include information on an idle channel sensed by the second wireless communication terminal. A description regarding this will be provided later in relation to FIGS. 16 and 17.

The first wireless communication terminal transmits a frame indicating a channel allocated to the second wireless communication terminal. In detail, the first wireless communication terminal may transmit the frame indicating the channel allocated to the second wireless communication terminal through the channel allocated to wireless communication terminal. At this point, the frame indicating the channel allocated to the second wireless communication terminal may include information indicating a time available for data transmission by the second wireless communication terminal. At this point, the time available for data transmission may be a time commonly applied to the plurality of second wireless communication terminals. Accordingly, the time available for the data transmission may be determined based on the longest time among required times for data transmission by the plurality of second wireless communication terminals. At this point, the time available for data transmission may be transmitted as a duration field value of a frame indicating the channel allocated to the second wireless communication terminal. Accordingly, the duration field value of the frame indicating the channel allocated to the second wireless communication terminal may be designated based on a required transmission time of the largest data among pieces of transmission data by the plurality of second wireless communication terminals. In addition, the frame indicating the channel allocated to the second wireless communication terminal may be a CTS frame.

The second wireless communication terminal acquires information on a channel allocated thereto on the basis of the frame indicating the channel allocated to the second wireless communication terminal. When the frame indicating the channel allocated to the second wireless communication terminal is the CTS frame, the second wireless communication terminal determines, as a channel allocated thereto, a channel through which a CTS frame has been transmitted, the CTS frame having a receiver address (RA) as an identifier for identifying the second wireless communication terminal. At this point, the identifier for identifying the second wireless communication terminal may be a media access control (MAC) address corresponding to an AID of the second wireless communication terminal.

The second wireless communication terminal transmits data to the first wireless communication terminal through the channel allocated to the communication terminal. At this point, when a time is left for transmitting data after transmitting the second wireless communication terminal's data, the second wireless communication terminal may transmit dummy data. At this point, the dummy data indicates meaningless data distinguished from meaningful data transmitted through a data frame. In detail, the dummy data may have a pattern in which a specific value like "0" is continued. In detail, the dummy data may be referred to as a busytone. In a detailed embodiment, the second wireless communication terminal may transmit data, and transmit the dummy data during a time when data may be transmitted after the data frame is transmitted. After the data frame transmission may indicate after an FCS field of the data frame is transmitted. In addition, the data frame is a frame transmitting data distinguished from a control frame. In detail, the data frame may include meaningful data distinguished from the dummy data. At this point, as described above, the second wireless communication terminal may acquire, from a frame indicating the channel allocated to the second wireless communication terminal, information on a time when the data may be transmitted. In detail, the second wireless communication terminal may acquire, from a duration field of a frame indicating the channel allocated to the second wireless communication terminal, the time when the data may be transmitted. Through such an operation of the second wireless communication terminal, another wireless communication terminal may be prevented from using the corresponding channel. In addition, when the second wireless communication terminal transmits the dummy data after transmitting the data frame, the first wireless communication terminal does not require processing data to be transmitted through the corresponding channel during transmission of the dummy data. Accordingly, through such an operation, a processing burden on the first wireless communication terminal may be reduced.

The first wireless communication terminal transmits an ACK frame to each of the plurality of second wireless communication terminals that has transmitted data through the channel allocated thereto.

In the embodiment of FIG. 13, a first station STA1, a second station STA2, a third station STA3, and a fourth station STA4 respectively transmit required information for channel allocation to an access point AP using different orthogonal codes (operation S1301).

The access point AP performs autocorrelation on the received signal to acquire required information for channel allocation from respective signals transmitted from the first station STA1, the second station STA2, the third station STA3, and the fourth station STA4. At this point, since the first station STA1, the second station STA2, the third station STA3, and the fourth station STA4 use different orthogonal codes, the access point may distinguish the signals transmitted from the first station STA1, the second station STA2, the third station STA3, and the fourth station STA4.

The access point AP allocates channels to the first station STA1, the second station STA2, the third station STA3, and the fourth station STA4 on the basis of the required information for channel allocation. At this point, the access point AP senses idle channels and allocates the idle channels to the first station STA1, the second station STA2, and the third station STA3. In detail, the access point AP allocates a primary channel Primary to the first station STA1, a first secondary channel Secondary 1 to the second station STA2, a sixth secondary channel Secondary 6 to the third station, and a second secondary channel Secondary 2 to the fourth station.

The access point AP transmits a CTS frame to the first station STA1, the second station STA2, the third station STA3, and the fourth station STA4 through respective channels allocated thereto (operation S1302).

The first station STA1, the second station STA2, the third station STA3, and the fourth station STA4 transmit data through the respective channels allocated thereto (operation S1303). At this point, the second station STA2, the third station STA3, and the fourth station STA4 transmit dummy data until transmission by the first station STA1 will be terminated, even after data transmissions of their own were terminated. At this point, detailed transmission operations of the second station STA2, the third station STA3, and the fourth station STA4 may be the same as described above.

The access point AP receives data from each of the first station STA1, the second station STA2, the third station STA3, and the fourth station STA4 and transmits an ACK frame to each of the first station STA 1, the second station STA2, the third station STA3, and the fourth station STA4.

Figure 14:
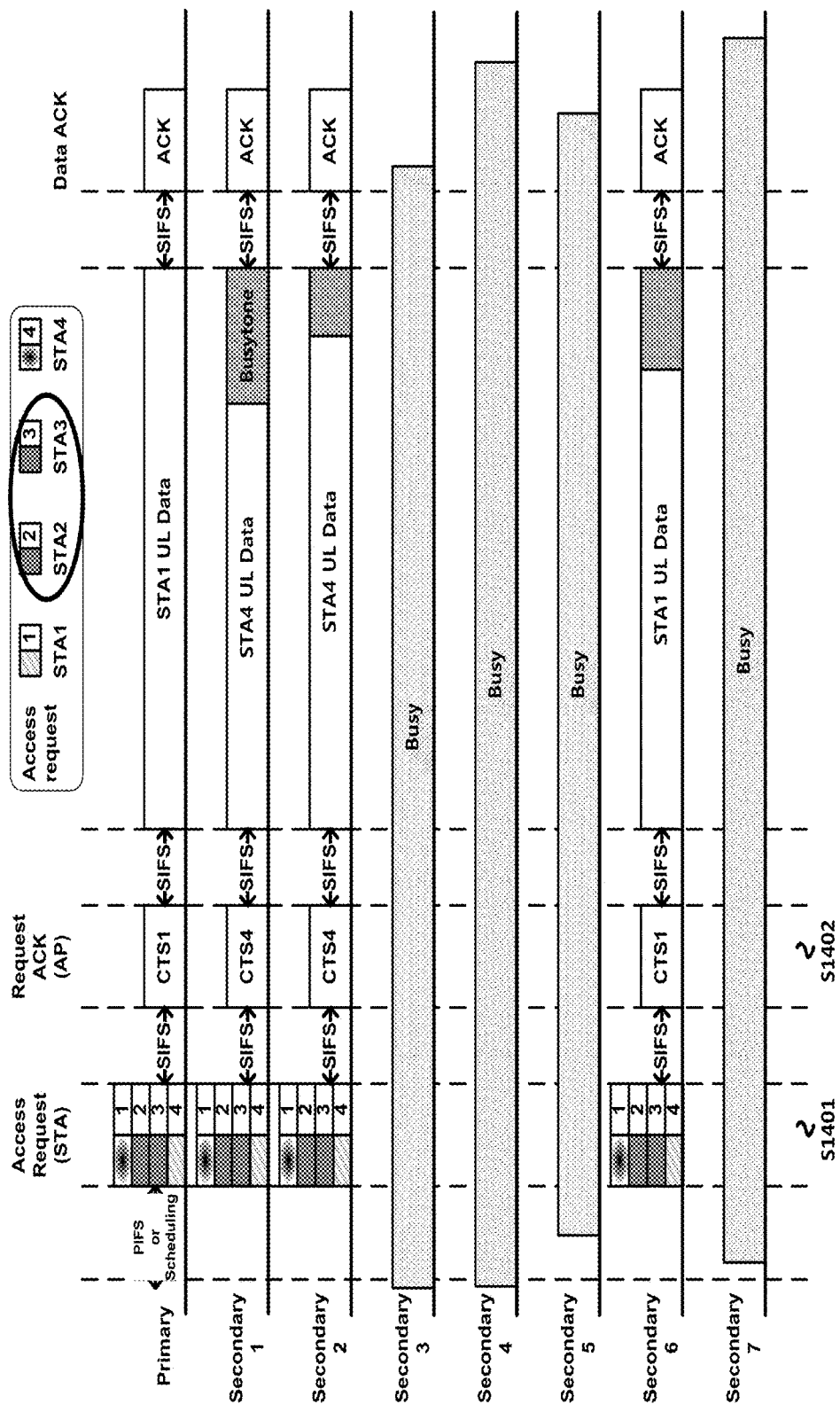
FIG. 14 shows that the plurality of stations according to an embodiment of the present invention transmit data to the access point when the plurality of stations use an overlapping orthogonal code set.

FIG. 14 shows that the plurality of stations according to an embodiment of the present invention transmit data to the access point when the plurality of stations use an overlapping orthogonal code set.

As described above, when the plurality of second wireless communication terminals transmit signals using an identical orthogonal code, in some cases, the first wireless communication terminal may not decode the signals having been transmitted by the plurality of second wireless communication terminals. In such a case, the first communication terminal allocates a channel only for a second communication terminal having transmitted a decodable signal and transmits a frame indicating a channel allocated to the second wireless communication terminal having transmitted the decodable signal.

In the embodiment of FIG. 14, the first station STA1 and the fourth station STA4 transmit required information for channel allocation to an access point AP by using different orthogonal codes (operation S1401). However, the second station STA2 and the third station STA3 transmit required information for channel allocation to the access point AP by using an identical orthogonal code.

The access point (AP) performs autocorrelation on the received signal to acquire required information for channel allocation from respective signals transmitted from the first station STA1 and the fourth station STA4. At this point, since the first station STA1 and the fourth station STA4 uses different orthogonal codes, the access point may distinguish a signal transmitted by the first station STA1 from a signal transmitted by the fourth station STA4. However, since the second station STA2 and the third station STA3 use the identical orthogonal code to cause a collision, the access point AP may not decode signals transmitted by the second station STA2 and the third station STA3.

The access point AP allocates channels to the first station STA1 and the fourth station STA4 on the basis of required information for channel allocation. In detail, the access point AP allocates the primary channel Primary and the sixth secondary channel Secondary 6 to the first station STA1 and the first secondary channel Secondary 1 and the second secondary channel Secondary 2 to the fourth station. Since unable to decode signals transmitted by the second station STA2 and the third station STA3, the access point AP does not allocate channels to the second station STA2 and the third station STA3.

The access point AP transmits a CTS frame to the first station STA1 and the fourth station STA4 through channels respectively allocated thereto (operation S1402).

The first station STA1 and the fourth station STA4 transmit data through channels respectively allocated thereto. At this point, the fourth station STA4 transmits dummy data until transmission by the first station STA1 will be completed, even after data transmission by its own was terminated. At this point, a detailed transmission operation of the fourth station STA4 may be the same as the embodiment described above. In addition, the first station STA1 independently uses two allocated channels to transmit data. In detail, the first station STA1 transmits two pieces of data having different sizes through two respective channels allocated by the access point AP. At this point, the first station STA1 transmits dummy data through the six secondary channel Secondary 6 through which data transmission was already terminated.

The access point AP transmits respective ACK frames to the first station STA1 and the fourth station STA4, after receiving data therefrom.

The method for notifying, by the first wireless communication terminal, the second wireless communication terminal of the access time to the first wireless communication terminal has been described before. In particular, the method for notifying, by the first wireless communication terminal, the second wireless communication terminal of the access period to the first wireless communication terminal has been described before. However, there may be a clock synchronization difference between the plurality of second wireless communication terminals. In addition, there is a concern that the access time of each of the plurality of second wireless communication terminals varies according to a channel occupancy situation of an adjacent BSS. Accordingly, a method is required to ensure that the plurality of second wireless communication terminals simultaneously attempt to access the first wireless communication terminal. A description thereabout will be provided in relation to FIG. 15.

Figure 15:
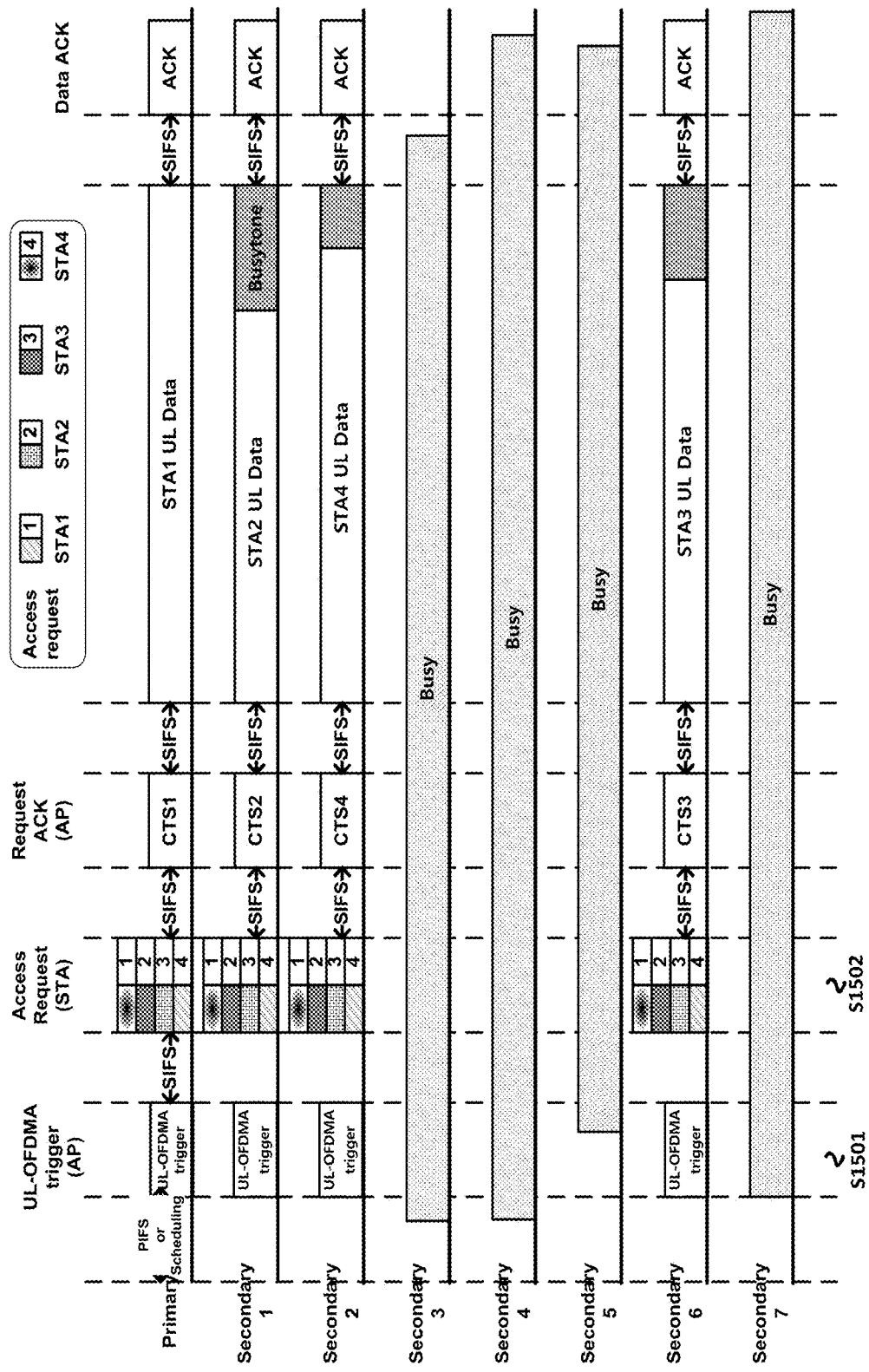
FIG. 15 shows that the plurality of stations according to an embodiment of the present invention transmit data to the access point on the basis of a trigger frame through which the plurality of stations trigger uplink transmission.

FIG. 15 shows that the plurality of stations according to an embodiment of the present invention transmit data to the access point on the basis of a trigger frame through which the plurality of stations trigger uplink transmission.

The first wireless communication terminal may transmit, to the second wireless communication terminal, a trigger frame for triggering a multiple access to the first wireless communication terminal by the second wireless communication terminal. In detail, the first wireless communication terminal may transmit the trigger frame to the second wireless communication terminal in a constant period. In another detailed embodiment, the first wireless communication terminal may transmit the trigger frame to the second wireless communication terminal, after a certain time passes from when having received a frame from the second wireless communication terminal. At this point, the trigger frame may comply with an RTS frame format. In detail, the first wireless communication terminal may set, as a specific address, a value of an RA field indicating a receiver address in the RTS frame, and transmit the RTS frame to the plurality of second wireless communication terminals. At this point, the specific address is to indicate an uplink access and may be a broadcast address designated in advance.

The second wireless communication terminal having received the trigger frame transmits required information for channel allocation to the first wireless communication terminal. In detail, after a certain time from when the trigger frame has been transmitted, the second wireless communication terminal may transmit required information for channel allocation to the first wireless communication terminal. At this point, the certain time may be a short inter-frame space (SIFS) defined in 802.11 standards.

Thereafter, operations of the first and second wireless communication terminals may be the same as the embodiments described above.

In an embodiment of FIG. 15, the access point AP transmits a trigger frame for triggering multiple uplink accesses to a plurality of stations (operation S1501).

The first station STA1, the second station STA2, the third station STA3, and the fourth station STA4, which have received the trigger frame, respectively transmit required information for channel allocation to the access point AP using different orthogonal codes (operation S1502).

Then, operations of the access point AP, the first station STA1, the second station STA2, the third station STA3, and the fourth station STA4 may be the same as described in relation to the embodiment of FIG. 13.

Figure 16:
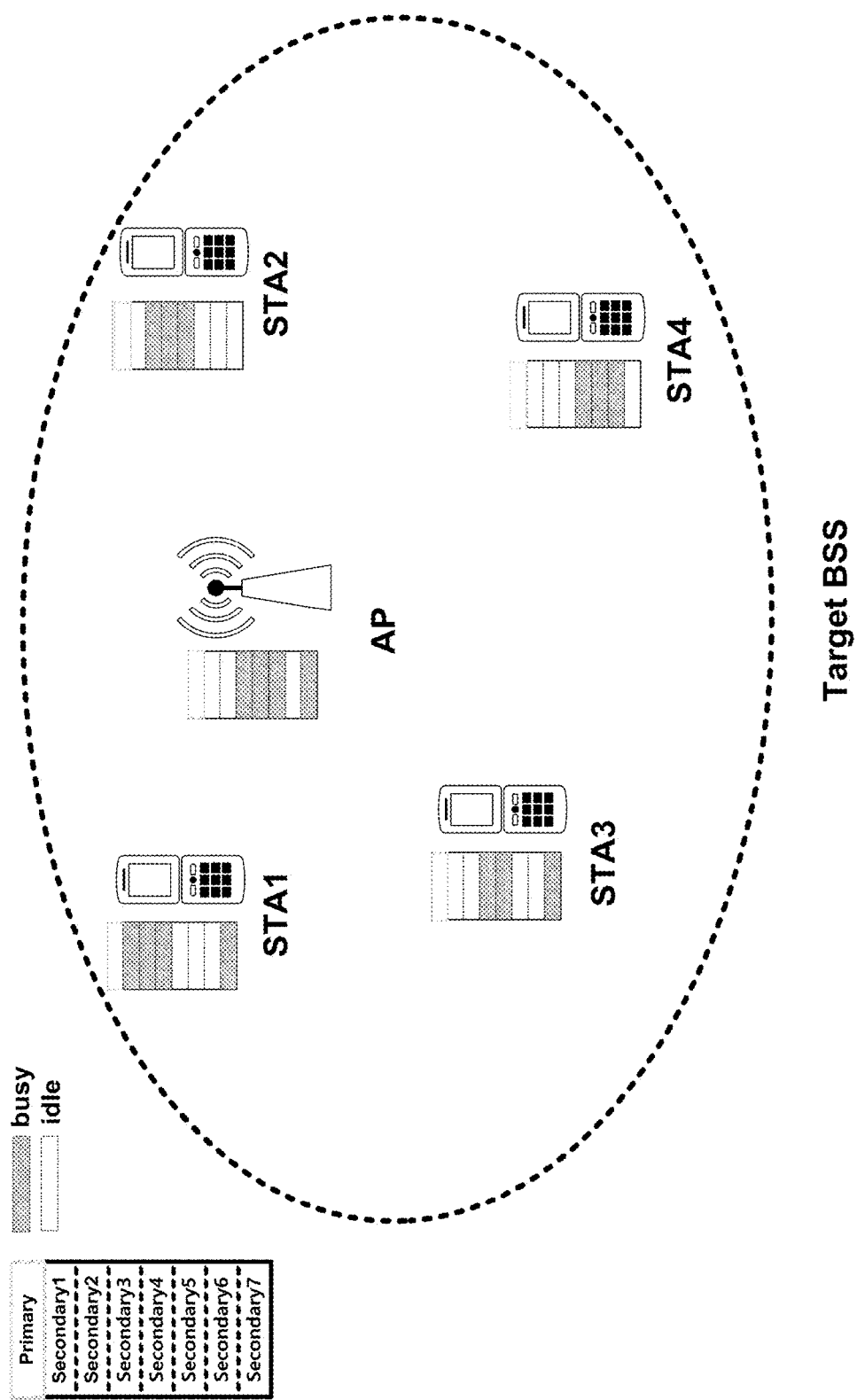
FIG. 16 shows a basic service set including the plurality of stations and the access point according to an embodiment of the present invention.
Figure 17:
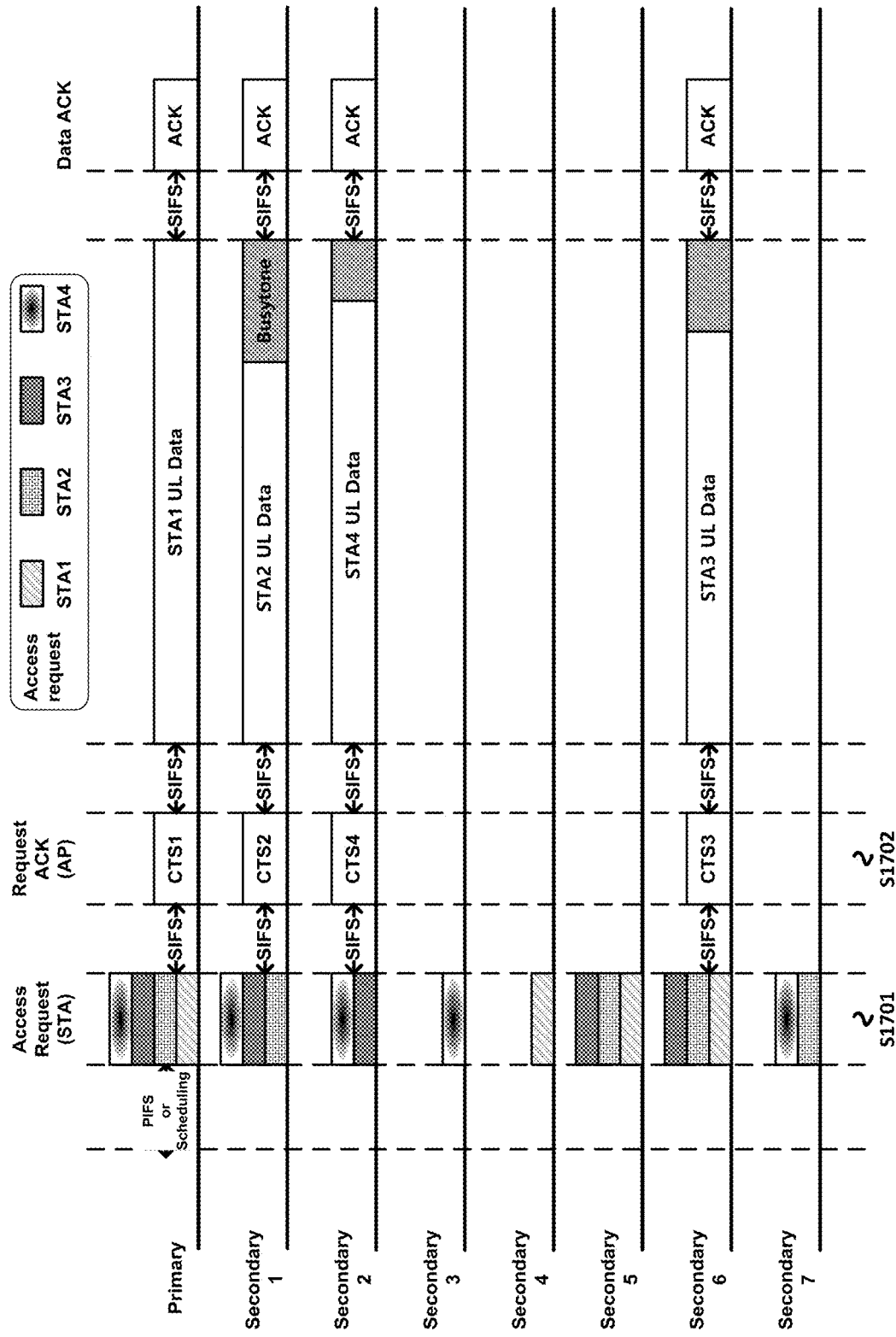
FIG. 17 shows that the plurality of stations according to an embodiment of the present invention transmit data to the access point, when idle channels sensed by the plurality of stations are different from those sensed by the access point.

Descriptions about that the first wireless communication terminal efficiently determines channels to be allocated to the plurality of wireless communication terminals will be provided in relation to FIGS. 16 and 17.

FIG. 16 shows a basic service set including the plurality of stations and the access point according to an embodiment of the present invention.

Channel circumstances sensed by each of the first wireless communication terminal and the plurality of second wireless communication terminals may be different. Accordingly, when channels are respectively allocated to the plurality of second wireless communication terminals in consideration of only channel states sensed by the first wireless communication terminal, the first wireless communication terminal may allocate channels causing a collision with a wireless communication terminal in another BSS to the plurality of second wireless communication terminals. Such a situation will be described in relation to an embodiment of FIG. 16.

In the embodiment of FIG. 16, the access point AP senses, as idle channels, the primary channel Primary, the first secondary channel Secondary 1, the second secondary channel Secondary 2, the third secondary channel Secondary 3, and the sixth secondary channel Secondary 6. However, the first station senses, as idle channels, the primary channel Primary, the fourth secondary channel Secondary 4, the fifth secondary channel Secondary 5, and the sixth secondary channel Secondary 6. In addition, the second station STA2 senses, as idle channels, the primary channel Primary, the first secondary channel Secondary 1, the fifth secondary channel Secondary 5, the sixth secondary channel Secondary 6, and a seventh secondary channel Secondary 7. In addition, the third station STA3 senses, as idle channels, the primary channel Primary, the first secondary channel Secondary 1, the second secondary channel Secondary 2, the fifth secondary channel Secondary 5, and the sixth secondary channel Secondary 6. In addition, the fourth station STA4 senses, as idle channels, the primary channel Primary, the first secondary channel Secondary 1, the second secondary channel Secondary 2, the third secondary channel Secondary 3, and the seventh secondary channel Secondary 7.

At this point, when the access point allocates the second secondary channel Secondary 2 to the first station STA1, the first secondary channel Secondary 3 to the second station STA2, the primary channel Primary to the third station STA3, and the sixth secondary channel Secondary 6 to the fourth station STA4, the remaining stations except the third station may not use the allocation channels. Therefore, the first wireless communication terminal is required to respectively allocate channels to the second wireless communication terminals in consideration of channel states sensed by the plurality of second wireless communication terminals. A description thereabout will be provided in relation to FIG. 17.

FIG. 17 shows that the plurality of stations according to an embodiment of the present invention transmit data to the access point, when idle channels sensed by the plurality of stations are different from those sensed by the access point.

As described above, the second wireless communication terminal may transmit channel access map information indicating a channel with which the first wireless communication terminal desires to be allocated. At this point, the channel access map information may include information on an idle channel sensed by the second wireless communication terminal.

The first wireless communication terminal may allocate a channel to the second wireless communication on the basis of an idle channel sensed by the second wireless communication terminal and the channel access map information received from the second wireless communication terminal. In detail, when the first wireless communication terminal senses any one channel as being idle and the channel access map information indicates the corresponding channel to be idle, the first wireless communication terminal may allocate the corresponding channel to the second wireless communication channel.

In addition, the second wireless communication terminal may transmit required information for channel allocation through every channel determined to be idle by the second wireless communication terminal. In this case, the first wireless communication terminal may determine which channel is sensed to be idle by the second wireless communication terminal without the channel access map information. Accordingly, the first wireless communication terminal may allocate, to the second wireless communication terminal, a channel through which the second wireless communication terminal transmits required information for channel allocation and which is determined to be idle by the first wireless communication terminal.

The first wireless communication terminal transmits a frame indicating a channel allocated to the second wireless communication terminal. When the required information for channel allocation described above does not include an identifier or an address of the second wireless communication terminal, a receiver address in the frame indicating the channel allocated to the second wireless communication terminal may be an index of an orthogonal code used by the second wireless communication terminal. In another detailed embodiment, a receiver address of a frame indicating a channel allocated to the second wireless communication terminal may be an address value designated in advance according to the index of the orthogonal code used by the second wireless communication terminal.

In the embodiment of FIG. 17, the first station STA1 transmits required information for channel allocation to the access point AP through the primary channel Primary, the first secondary channel Secondary 1, the second secondary channel Secondary 2, the third secondary channel Secondary 3, and the seventh secondary channel Secondary 7 (operation S1701). In addition, the second station STA2 transmits required information for channel allocation to the access point AP through the primary channel Primary, the first secondary channel Secondary 1, the fifth secondary channel Secondary 5, the sixth secondary channel Secondary 6, and the seventh secondary channel Secondary 7 (operation S1701). In addition, the third station STA3 transmits required information for channel allocation to the access point AP through the primary channel Primary, the first secondary channel Secondary 1, the second secondary channel Secondary 2, the fifth secondary channel Secondary 5, and the sixth secondary channel Secondary 6 (operation S1701). In addition, the fourth station STA4 transmits required information for channel allocation to the access point AP through the primary channel Primary, the first secondary channel Secondary 1, the second secondary channel Secondary 2, and the third secondary channel Secondary 3 (operation S1701).

The access point AP allocates respective channels to the first station STA1, the second station STA2, the third station STA3 and the fourth station STA4 on the basis of channels through which the first station STA1, the second station STA2, the third station STA3 and the fourth station STA4 transmit required information for channel allocation and channels determined to be idle by the access point AP. In detail, in the embodiment of FIG. 17, the access point AP senses, as idle channels, the primary channel Primary, the first secondary channel Secondary 1, the second secondary channel Secondary 2, and the sixth secondary channel Secondary 6. Accordingly, the access point AP allocates the primary channel Primary to the first station STA1, the first secondary channel Secondary 1 to the second station STA2, the secondary channel Secondary 2 to the fourth station STA4, and the sixth secondary channel Secondary 6 to the third station STA3.

The access point AP respectively transmits a CTS frame to the first station STA1, the second station STA2, the third station STA3, and the fourth station STA4 through channels respectively allocated thereto.

Then the operations of the access point AP and the stations may be the same as the embodiments described above.

Figure 18:
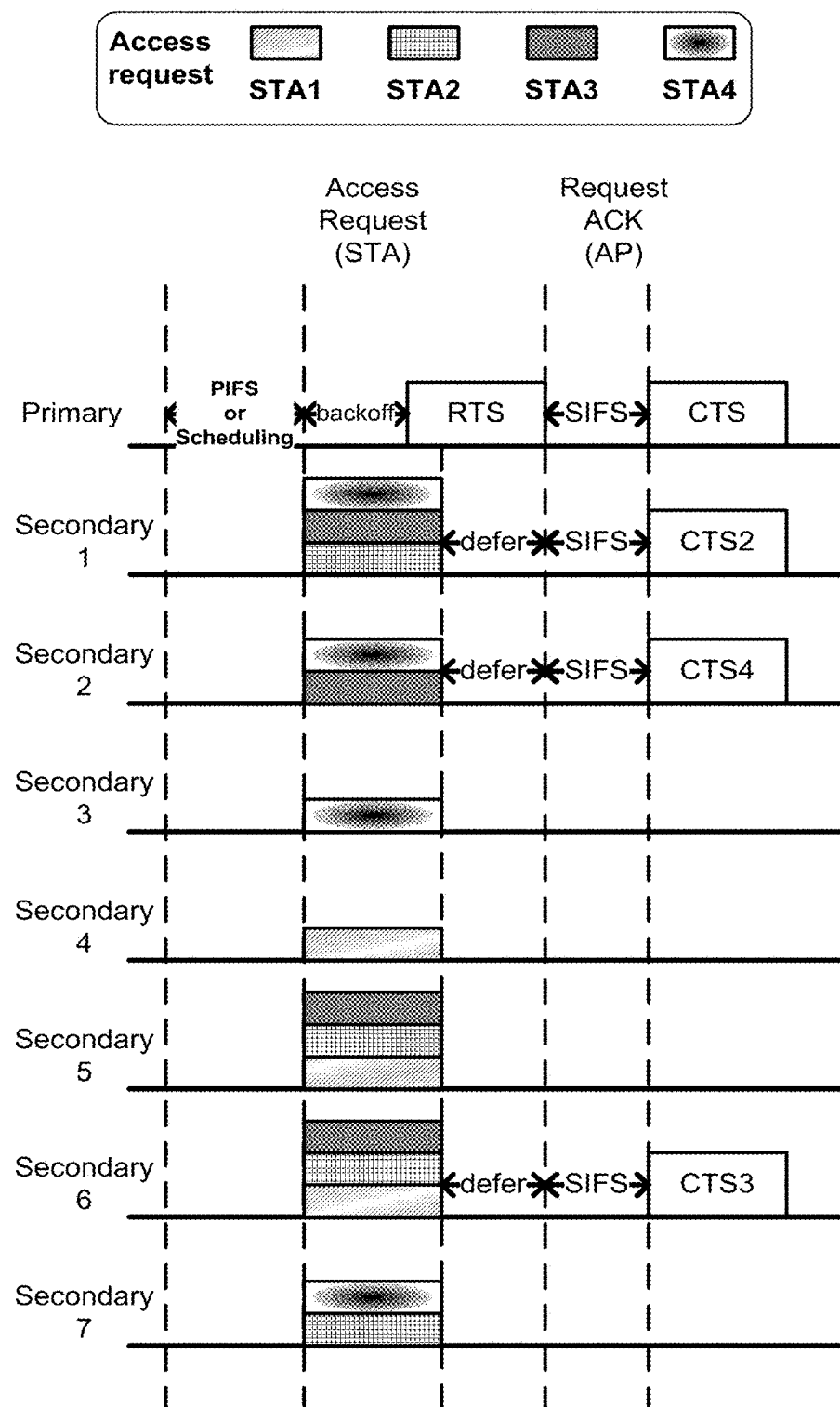
FIG. 18 shows that the plurality of stations according to an embodiment of the present invention transmit data to the access point in consideration of a station that does not support the embodiment of the present invention.

FIG. 18 shows that the plurality of stations according to an embodiment of the present invention transmit data to the access point in consideration of a station that does not support the embodiment of the present invention.

When the plurality of second wireless communication terminals access the first wireless communication terminal in the way of the above-described embodiments, there may be a problem of a compatibility with a wireless communication terminal that does not support the embodiments of the present invention. For example, when not undergoing a backoff process according to a contention procedure while accessing the first wireless communication terminal, there is a concern that the second wireless communication terminal occupies unconditional superiority in channel use contention with wireless communication terminals that do not support the embodiments of the present invention. Accordingly, the second wireless communication terminal may access the first wireless communication terminal through the remaining channels except the primary channel. In detail, the second wireless communication terminal may transmit required information for channel allocation to the first wireless communication terminal through the remaining channels except the primary channel. In a detailed embodiment, the second wireless communication terminal may transmit the required information for channel allocation to the first wireless communication terminal through the remaining channels except the primary channel by using an orthogonal code.

In addition, when the wireless communication terminal that does not support the embodiments of the present invention transmits a frame to the first wireless communication terminal through the primary channel, it is efficient that the first wireless communication terminal simultaneously performs processes on the second wireless communication terminal and the wireless communication terminal that does not support the embodiments of the present invention. For example, when the wireless communication terminal that does not support the embodiments of the present invention transmits an RTS frame to the first wireless communication terminal, it is efficient that the first wireless communication terminal simultaneously transmits the CTS frame to the second wireless communication terminal and the wireless communication terminal that does not support the embodiments of the present invention. However, since the wireless communication terminal that does not support the embodiments of the present invention transmits a frame after undergoing a backoff process, a time for transmitting the frame may be delayed. Accordingly, in consideration of this, the second wireless communication terminal may transmit required information for channel allocation to the first wireless communication terminal and then wait a certain time. In another detailed embodiment, in consideration of this, the second wireless communication terminal may transmit the required information for channel allocation to the first wireless communication terminal and then perform subsequent operations when there is no frame transmission through the primary channel for a certain time.

In the embodiment of FIG. 18, the first station, the second station, the third station, and the fourth station transmit the required information for channel allocation through the secondary channels except the primary channel and wait a certain time.

While the first station, the second station, the third station, and the fourth station wait, the wireless communication terminal that does not support the embodiments of the present invention transmits the RTS frame through the primary channel.

The access point AP respectively transmits the CTS frame to the first station, the second station, the third station, and the fourth station through channels respectively allocated thereto.

In addition, at the same time, the access point AP transmits the CTS frame through the primary channel to the wireless communication terminal that does not support the embodiments of the present invention.

In this way, since stations supporting the embodiments of the present invention transmit required information for channel allocation and then wait, the access point AP may simultaneously perform transmission on the wireless communication terminal that does not support the embodiments of the present invention and transmission on the station supporting the embodiments of the present invention.

When the second wireless communication terminals simultaneously access the first wireless communication terminal, a processing amount of the first wireless communication terminal becomes several times that of a case where any one of the second wireless communication terminals accesses the first wireless communication terminal. Accordingly, there occurs a problem that a processing time of the first wireless communication terminal increases and an interval between frames becomes excessively large. When the interval between frames becomes excessively large, there is a concern that a wireless terminal not currently participating in communication with the first wireless communication terminal accesses a channel currently in use. Accordingly, a method is required which may reduce a processing burden on the first wireless communication terminal, which is doubled by a multiple access.

Figure 19:
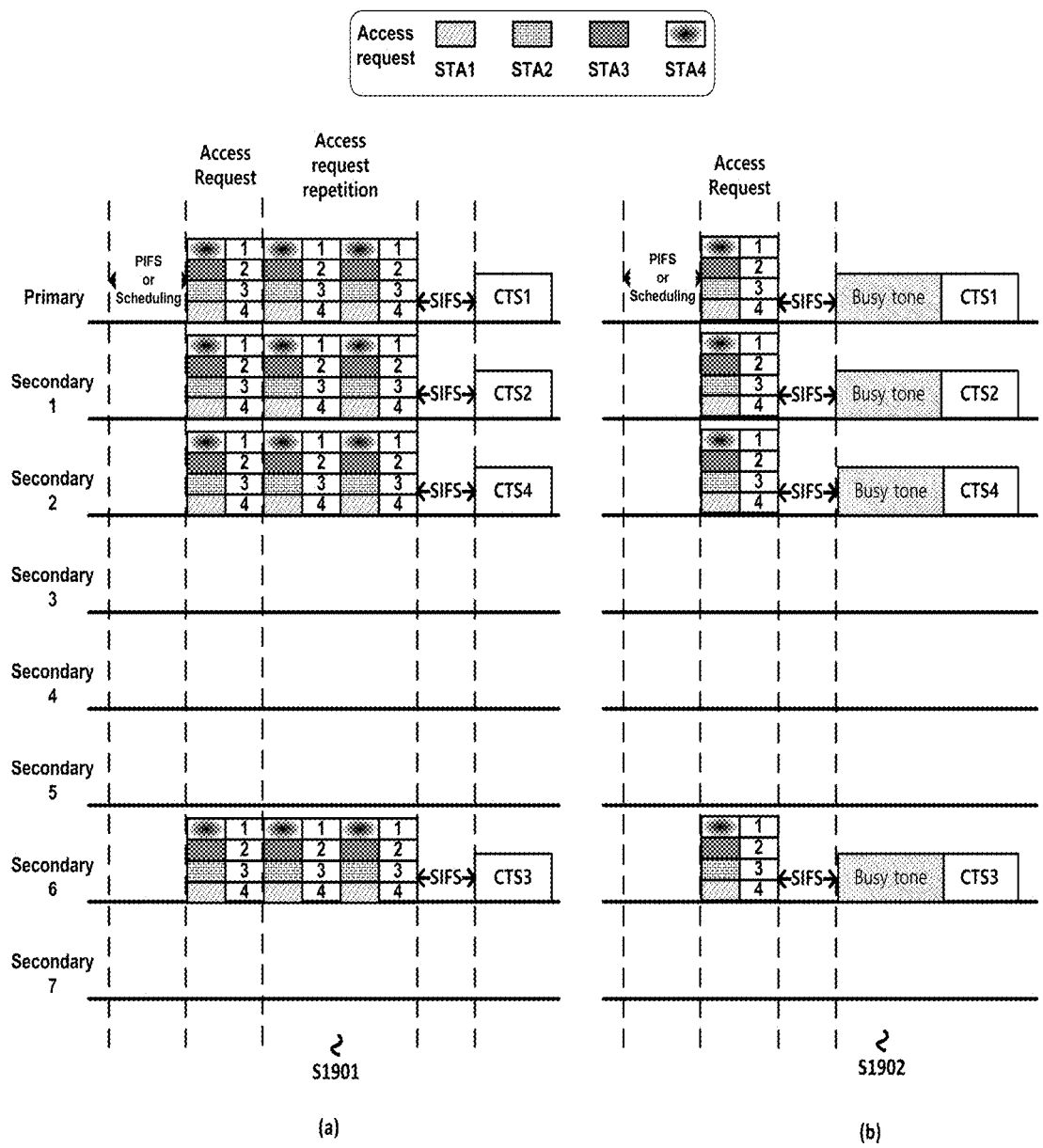
FIG. 19 shows operations of the plurality of stations in consideration of a case where a channel allocation processing time by the access point according to an embodiment of the present invention is delayed.

FIG. 19 shows operations of the plurality of stations in consideration of a case where a channel allocation processing time by the access point according to an embodiment of the present invention is delayed.

The second wireless communication terminal may transmit dummy data after transmitting any one frame to the first wireless communication terminal. In detail, the second wireless communication terminal may transmit up to an FCS field of any one frame to the first wireless communication terminal and then transmit dummy data. As described above, such dummy data may be referred to as a busytone. In detail, the second wireless communication terminal may transmit a frame including required information for channel allocation to the first wireless communication terminal and then transmit dummy data. In addition, the second wireless communication terminal may transmit a data frame including data to the first wireless communication terminal and then transmit dummy data. In a detailed embodiment, the second wireless communication terminal may transmit dummy data after a certain time passes from when having transmitted a frame to the first wireless communication terminal. At this point, the certain time may be an SIFS defined in 802.11 standards. Through this, the first wireless communication terminal may have a time for processing while dummy data is transmitted. In addition, another terminal that does not participate in transmission may be prevented from accessing the corresponding channel.

The second wireless communication terminal may repeatedly transmit an identical frame to the first wireless communication terminal. In detail, the second wireless communication terminal may repeatedly transmit a frame including required information for channel allocation to the first wireless communication terminal. In addition, the second wireless communication terminal may repeatedly transmit a frame including data to the first wireless communication terminal. At this point, the first wireless communication terminal may ignore a repeatedly received frame. Through this, the first wireless communication terminal may have a time for processing. In addition, another terminal that does not participate in transmission may be prevented from accessing the corresponding channel.

In an embodiment of FIG. 19(a), the first station STA1, the second station STA2, the third station STA3, and the fourth station STA4 respectively transmit frames including required information for channel allocation to the access point AP using different orthogonal codes. At this point, the first station STA1, the second station STA2, the third station STA3, and the fourth station STA4 transmit two times more the frame including the required information for channel allocation to the access point AP (operation S1901). The access point AP ignores second and third frames received after a frame including required information for channel allocation has been received at first. Through this, the access point AP secures a processing time for allocating channels to the first station STA1, the second station STA2, the third station STA3, and the fourth station STA4.

The access point AP transmits a CTS frame to the first station STA1, the second station STA2, the third station STA3, and the fourth station STA4 through channels respectively allocated thereto.

In an embodiment of FIG. 19(b), the first station STA1, the second station STA2, the third station STA3, and the fourth station STA4 respectively transmit frames including required information for channel allocation to the access point AP by using different orthogonal codes.

The first station STA1, the second station STA2, the third station STA3, and the fourth station STA4 transmit the frame including the required information for channel allocation to the access point AP and then transmit dummy data thereto (operation S1902). In detail, the first station STA1, the second station STA2, the third station STA3, and the fourth station STA4 transmit the dummy data to the access point AP after an SIFS from when transmitting the frame including the required information for channel allocation thereto. Through this, the access point AP secures a processing time for allocating channels to the first station STA1, the second station STA2, the third station STA3, and the fourth station STA4.

The access point AP respectively transmits the CTS frame to the first station STA1, the second station STA2, the third station STA3, and the fourth station STA4 through channels respectively allocated thereto.

Figure 20:
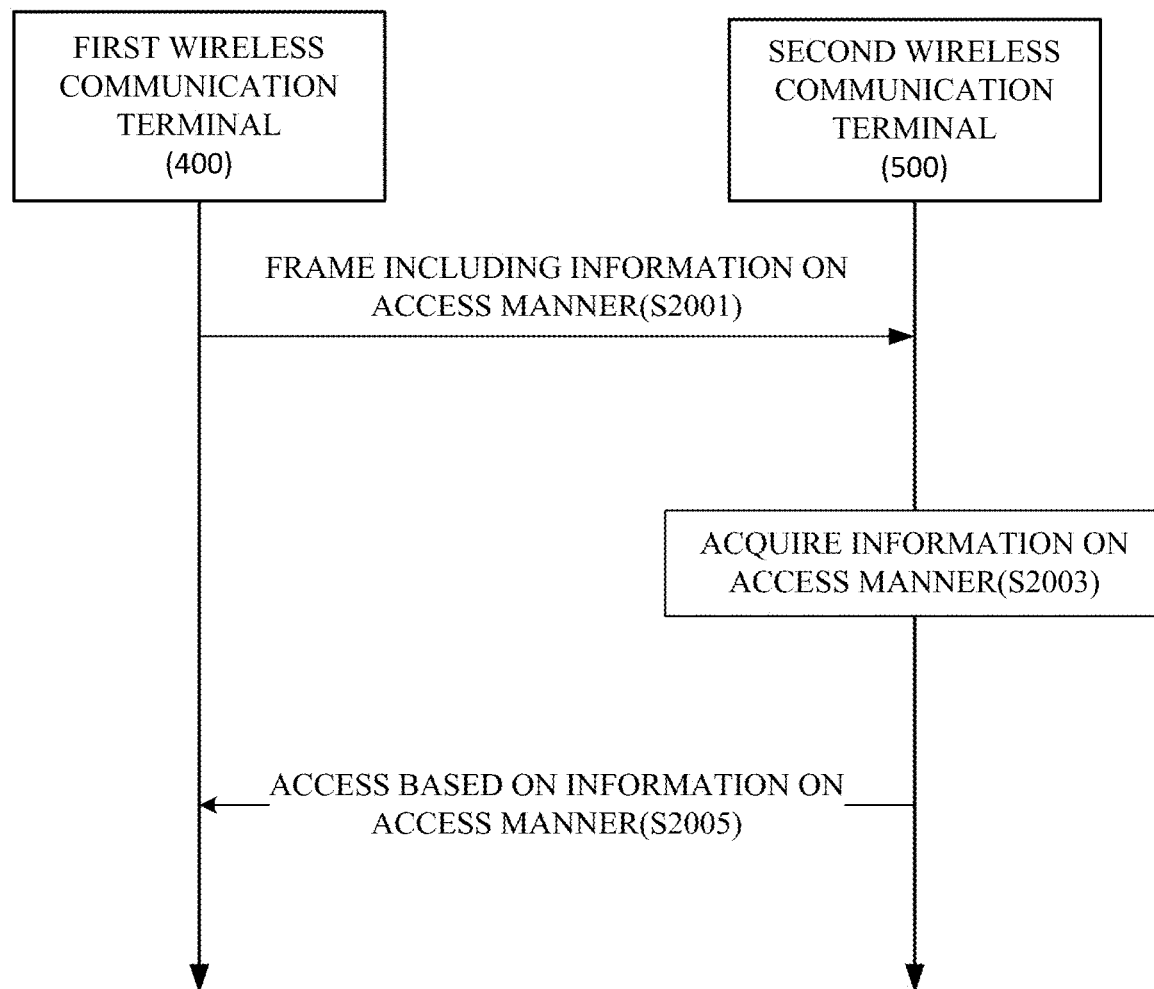
FIG. 20 is a ladder diagram showing an operation in which the second wireless communication terminal according to an embodiment of the present invention transmits data to the first wireless communication terminal.

FIG. 20 is a ladder diagram showing an operation in which the second wireless communication terminal according to an embodiment of the present invention transmits data to the first wireless communication terminal.

The first wireless communication terminal 300 transmits a frame including information on an access method to the second wireless communication terminal 500 (operation S2001).

As described above, the information on the access manner may include a plurality of access methods for allowing the plurality of second wireless communication terminals 500 to perform accesses using a certain communication manner. In addition, the information on the access manner may include information on an orthogonal code used for accessing, by the second wireless communication terminals 500, the first wireless communication terminal. In detail, the information on the orthogonal code may include information on an orthogonal code set including a plurality of orthogonal codes. In another detailed embodiment, the orthogonal code may be designated in advance to the second wireless communication terminal 500. At this point, the second wireless communication terminal 500 may be allocated with an orthogonal code as an association identifier for identifying an association with the first wireless communication terminal 400 in an association process with the first wireless communication terminal 400. In this way, the second wireless communication terminal 500 may access the first wireless communication terminal 400 using an orthogonal code allocated thereto without any separate process.

In addition, the information on the access manner may include information on a time for accessing, by the second wireless communication terminal 500, the first wireless communication terminal 400, as described above. In detail, the information on the access manner may include information on a period that the second wireless communication terminal 500 accesses the first wireless communication terminal 400. In a detailed embodiment, the information on the access manner may include the number of times that the second wireless communication terminal 500 accesses the first wireless communication terminal 400 for a certain period.

In another detailed embodiment, the first wireless communication terminal 400 may transmit, to the second wireless communication terminal 500, a frame for triggering an access by the second wireless communication terminal 500 without transmitting a detailed access time as described above. Through this, even when clocks of the second wireless communication terminals 500 are not synchronized, uplink access times of the plurality of second wireless communication terminals may be synchronized.

The second wireless communication terminal 500 acquires information on the access method on the basis of a frame including information on the access manner (operation S2003). The second wireless communication terminal 500 may acquire information on the orthogonal code used for the access to the second wireless communication 500 on the basis of the frame including the information on the access method. The second wireless communication terminal 500 may acquire information on the access time to the second wireless communication 500 on the basis of the frame including the information on the access method.

The second wireless communication terminal 500 accesses the first wireless communication terminal 400 on the basis of information on the access method (operation S2005).

In detail, the second wireless communication terminal 500 may randomly select any one of a plurality of access manners and transmit data to the first wireless communication terminal 400 on the basis of the selected access method. In addition, the second wireless communication terminal 500 may transmit data to the first wireless communication terminal 400 on the basis of information on the orthogonal code. In addition, the second wireless communication terminal 500 may transmit data to the first wireless communication terminal 400 on the basis of information on the access time.

In addition, the second wireless communication terminal 500 may access the first wireless communication terminal 400 using remaining channels except the primary channel. Through this, compatibility and channel contention fairness with a wireless communication terminal that does not support the embodiments of the present invention may be ensured.

Furthermore, the second wireless communication terminal 500 may be allocated with a channel from the first wireless communication terminal 400 by transmitting required information for channel allocation therefor on the basis of the information on the access manner. The second wireless communication terminal 500 may transmit data to the first wireless communication terminal 400 through the allocated channel.

In addition, the second wireless communication terminal 500 may transmit the required information for channel allocation therefor on the basis of the information on the access method. In detail, the required information for channel allocation may include information for indicating the size of data to be transmitted by the second wireless communication terminal. In addition, the required information for channel allocation may include an identifier for identifying the second wireless communication terminal 500. At this point, the identifier for identifying the second wireless communication terminal 500 may be an AID or a partial AID for identifying an association with the first wireless communication terminal 400. In addition, the required information for channel allocation may include channel access map information indicating a channel with which the second wireless communication terminal desires to be allocated. At this point, the channel access map information may include information on an idle channel sensed by the second wireless communication terminal 500. In a detailed embodiment, the second wireless communication terminal 500 may transmit the required information for channel allocation therefor on the basis of the information on the access time. In a detailed embodiment, the second wireless communication terminal 500 may transmit the required information for channel allocation therefor on the basis of the information on the orthogonal code.

The first wireless communication terminal 400 may transmit a frame indicating a channel allocated to the second wireless communication terminal 500 on the basis of the required information for channel allocation for the second wireless communication terminal 500. In detail, the first wireless communication terminal 400 may allocate the channel to the second wireless communication terminal on the basis of the required information for channel allocation for the second wireless communication terminal 500. In a detailed embodiment, the first wireless communication terminal 400 may allocate the channel to the second wireless communication terminal 500 on the basis of the size of data to be transmitted by the second wireless communication terminal 500. In another detailed embodiment, the first wireless communication terminal 400 may allocate the channel to the second wireless communication terminal 500 on the basis of information on an idle channel sensed by the second wireless communication terminal 500 and an idle channel sensed by the first wireless communication terminal. For example, when the first wireless communication terminal senses any one channel as an idle channel and the channel access map information indicates the corresponding channel as being idle, the wireless communication terminal 400 may allocate the corresponding channel to the second wireless communication channel 500. Through this, the first wireless communication terminal 400 may solve a hidden node problem and raise an efficiency of channel allocation.

In detail, the first wireless communication terminal 400 may transmit a frame indicating the channel allocated to the second wireless communication terminal 500 through the channel allocated to the second wireless communication terminal 500. At this point, the frame indicating the channel allocated to the second wireless communication terminal 500 may include information indicating a time available for data transmission by the second wireless communication terminal 500. At this point, the time available for data transmission may be a time commonly applied to the plurality of second wireless communication terminals 500. Accordingly, the time available for the data transmission may be determined based on the longest time among times required for data transmission by the plurality of second wireless communication terminals 500. At this point, the time available for data transmission may be transmitted as a duration field value of the frame indicating the channel allocated to the second wireless communication terminal 500. Accordingly, the duration field value of the frame indicating the channel allocated to the second wireless communication terminal may be determined based on a required transmission time of the largest data among transmission pieces of data of the plurality of second wireless communication terminals 500. In addition, the frame indicating the channel allocated to the second wireless communication terminal 500 may be a CTS frame.

The first wireless communication terminal 400 may transmit data to the first wireless communication terminal 400 on the basis of the frame indicating the allocated channel. At this point, the first wireless communication terminal 400 may transmit data to the first wireless communication terminal 400 through the channel indicated by the frame indicating the allocated channel.

In addition, the second wireless communication terminal 500 may transmit dummy data to the first wireless communication terminal 400. In detail, the second wireless communication terminal 500 may transmit the dummy data to the first wireless communication terminal 400. In detail, the second wireless communication terminal may transmit up to an FCS field of any one frame and then transmit the dummy data to the first wireless communication terminal. In a detailed embodiment, the second wireless communication terminal 500 may transmit a frame including the required information for channel allocation and then transmit the dummy data to the first wireless communication terminal. In another detailed embodiment, the second wireless communication terminal 500 may transmit a data frame including data and then transmit the dummy data to the first wireless communication terminal 400. For example, the second wireless communication terminal 500 may transmit the dummy data to the first wireless communication terminal 400, after a certain time passes from when having transmitted a frame to the first wireless communication terminal 400. Through this, the first wireless communication terminal 400 has a time for processing, while the dummy data is transmitted. In addition, another wireless communication terminal that does not participate in transmission may be prevented from accessing the corresponding channel.

The second wireless communication terminal 500 may repeatedly transmit an identical frame to the first wireless communication terminal 400. In detail, the second wireless communication terminal 500 may repeatedly transmit the frame including the required information for channel allocation to the first wireless communication terminal 400. The second wireless communication terminal 500 may repeatedly transmit a frame including data to the first wireless communication terminal 400. At this point, the first wireless communication terminal 400 may ignore the repeatedly received frame. Through this, the first wireless communication terminal 400 has a time for processing. In addition, another terminal that does not participate in transmission may be prevented from accessing the corresponding channel.

As described above, although wireless LAN communication is exemplarily described for the present invention, the present invention is not limited thereto and may be identically applied to another communication system such as cellular communication. In addition, although the method, device and system of the present invention are described in relation to specific embodiments, the configuration elements, a part of or the entirety of operations of the present invention may be implemented using a computer system having general purpose hardware architecture.

In the foregoing, features, structures, or effects described in connection with embodiments are included in at least one embodiment, and are not necessarily limited to one embodiment. Furthermore, the exemplified features, structures, or effects in various embodiments can be combined and modified by those skilled in the art. Accordingly, contents in connection with these combination and modification should be construed to fall in the scope of the present invention.

Although embodiments have been described with reference to a number of illustrative embodiments thereof, it should be understood that numerous other modifications and embodiments can be devised by those skilled in the art that will fall within the spirit and scope of the principles of the present invention. For example, variations and modifications in the component parts and/or arrangements, alternative uses will also be apparent to those skilled in the art. In addition, differences related to such modifications and application should be interpreted to be within the scope of the present invention defined in the appended claims.

The invention claimed is:

1. A wireless communication terminal comprising:
a transceiver; and
a processor,
wherein the processor is configured to:
receive, using the transceiver, a first trigger frame for triggering multiple access to a base wireless communication terminal,
transmit, at a designated time, information on whether each of channels is sensed to be idle by the wireless communication terminal at the designated time to the base wireless communication terminal simultaneously with a transmission of information on whether each of channels is sensed to be idle by one or more other wireless communication terminals from the one or more other wireless communication terminals, wherein the designated time is when a certain time elapsed from when the first trigger frame has been received,
receive a second trigger frame indicating a channel allocated to the wireless communication terminal, and
access the base communication terminal through the channel allocated to the wireless communication terminal.

2. The wireless communication terminal of claim 1,
wherein the processor is configured to transmit the information on whether each of channels is sensed to be idle by the wireless communication terminal using an orthogonal code.

3. The wireless communication terminal of claim 2,
wherein the processor is configured to randomly select any one of a plurality of orthogonal codes, and
transmit the information on whether each of channels is sensed to be idle by the wireless communication terminal using the selected orthogonal code.

4. A base wireless communication terminal comprising:
a transceiver; and
a processor,
wherein the processor is configured to:
transmit, using transceiver, a first trigger frame for triggering multiple access to the base wireless communication terminal to a plurality of wireless communication terminals,
simultaneously receive, from the plurality of wireless communication terminals, information on whether each of channels is idle at a designated time, wherein the information on whether each of channels is idle is transmitted at the designated time, wherein the designated time is when a certain time elapsed from when the first trigger frame has been received at the plurality of wireless communication terminals, and
transmit, to the plurality of wireless communication terminals, a second trigger first frame indicating channels allocated to the plurality of communication terminals.

5. An operation method of a wireless communication terminal included in a plurality of wireless communication terminals, the operation method comprising:
receiving a first trigger frame for triggering multiple access to a base wireless communication terminal,
transmitting, at a designated time, the information on whether each of channels is idle at the designated time to the base wireless communication terminal simultaneously with a transmission of information on whether each of channels is sensed to be idle by one or more other wireless communication terminals from the one or more other wireless communication terminals, wherein the designated time is when a certain time elapsed from when the first trigger frame has been received, receiving a second trigger frame comprising information indicating a channel allocated to the wireless communication terminal, and accessing the base communication terminal through the channel allocated to the wireless communication terminal, wherein the base wireless communication terminal is any one wireless communication terminal different from the plurality of wireless communication terminals.

6. The method of claim 5, wherein transmitting, at the designated time, the information on whether each of channels is idle at the designated time to the base wireless communication terminal comprises transmitting the information on whether each of channels is sensed to be idle by the wireless communication terminal using an orthogonal code.

7. The method of claim 5, wherein the transmitting the information on whether each of channels is sensed to be idle by the wireless communication terminal using an orthogonal code comprises randomly selecting any one of a plurality of orthogonal codes, and transmitting the information on whether each of channels is sensed to be idle by the wireless communication terminal using the selected orthogonal code.

* * * * *